(12) United States Patent
Kuwano et al.

(10) Patent No.: US 9,602,212 B2
(45) Date of Patent: Mar. 21, 2017

(54) OPTICAL COMMUNICATION SYSTEM, OPTICAL COMMUNICATION METHOD, HIGHER-NETWORK APPARATUS, AND OPTICAL LINE TERMINAL

(71) Applicant: NIPPON TELEGRAPH AND TELEPHONE CORPORATION, Tokyo (JP)

(72) Inventors: Shigeru Kuwano, Yokohama (JP); Jun Terada, Atsugi (JP); Noriko Iiyama, Yokosuka (JP); Takeshi Sakamoto, Yokoska (JP); Nobuyuki Tanaka, Atsugi (JP); Satoshi Shigematsu, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/441,423

(22) PCT Filed: Nov. 6, 2013

(86) PCT No.: PCT/JP2013/080047
§ 371 (c)(1),
(2) Date: May 7, 2015

(87) PCT Pub. No.: WO2014/077168
PCT Pub. Date: May 22, 2014

(65) Prior Publication Data
US 2015/0311980 A1 Oct. 29, 2015

(30) Foreign Application Priority Data

Nov. 14, 2012 (JP) .................... 2012-250356
Nov. 19, 2012 (JP) .................... 2012-253224

(51) Int. Cl.
*H04J 14/08* (2006.01)
*H04B 10/27* (2013.01)
(Continued)

(52) U.S. Cl.
CPC ....... *H04B 10/27* (2013.01); *H04B 10/25752* (2013.01); *H04J 14/08* (2013.01);
(Continued)

(58) Field of Classification Search
CPC .... H04B 10/27; H04B 10/25752; H04J 14/08
See application file for complete search history.

(56) References Cited

U.S. PATENT DOCUMENTS

2005/0058135 A1* 3/2005 Sisto ................. H04L 12/5695
370/395.2
2007/0014575 A1* 1/2007 Kramer ................ H04J 3/0652
398/71

(Continued)

FOREIGN PATENT DOCUMENTS

| JP | 2011-119850 | 6/2011 |
| JP | 2012-060503 | 3/2012 |
| JP | 2012-151557 | 8/2012 |

OTHER PUBLICATIONS

International Preliminary Report on Patentability dated May 28, 2015 corresponding to International Application No. PCT/JP2013/080047; 7 pages.

(Continued)

*Primary Examiner* — Dzung Tran
(74) *Attorney, Agent, or Firm* — Ohlandt, Greeley, Ruggiero & Perle, L.L.P.

(57) ABSTRACT

A communication system and method comprising a higher-network apparatus and a lower-network apparatus connected through a PON system, which transfers uplink data from the lower-network apparatus to the higher-network apparatus at (Continued)

high speed so as to meet severe conditions required for a delay time between the higher-network apparatus and the lower-network apparatus. The method including a scheduling execution process in which a higher-network apparatus performs scheduling for uplink communication from each of the lower-network apparatus to the device itself and an uplink data transmission permission process in which the higher-network apparatus calculates a transmission time and a transmission permission amount of uplink data transmitted from an ONU to OLT based on the scheduling for uplink communication and notifies the OLT.

20 Claims, 23 Drawing Sheets

(51) Int. Cl.
H04L 12/28 (2006.01)
H04Q 11/00 (2006.01)
H04B 10/2575 (2013.01)
(52) U.S. Cl.
CPC ..... *H04L 12/2861* (2013.01); *H04Q 11/0067* (2013.01); *H04Q 2011/0064* (2013.01)

(56) References Cited

U.S. PATENT DOCUMENTS

2009/0067850 A1* 3/2009 Mizutani ............... H04J 3/0605
398/154
2012/0063774 A1 3/2012 Niibe et al.
2013/0315596 A1* 11/2013 Rollet ................. H04L 12/2424
398/67
2014/0212139 A1* 7/2014 Murata ............... H04L 12/2861
398/66

OTHER PUBLICATIONS

"Technical Fundamentals Lecture, GE-PON Technology, 3rd DBA Function", NTT Technical Journal, pp. 67-70, Oct. 2005, with partial English translation thereof.
A. Larmo et al., "The LTE Link-Layer Design", IEEE Communications Magazine, pp. 52-59, Apr. 2009.
UMTS Long Term Evolution (LTE) Technology Introduction, Rohde & Schwarz Application Note, 1MA111, 2008.
CPRI Specification V5.0, 2011.
International Search Report dated Dec. 3, 2013 corresponding to PCT/JP2013/080047; 2 pages.

* cited by examiner

OPTICAL COMMUNICATION SYSTEM, OPTICAL COMMUNICATION METHOD, HIGHER-NETWORK APPARATUS, AND OPTICAL LINE TERMINAL

BACKGROUND

1. Field of the Disclosure

The present disclosure relates to a technique of transferring uplink data at high speed from a lower-network apparatus to a higher-network apparatus in a communication system constituted of the higher-network apparatus and the lower-network apparatus connected through an optical subscriber system (PON: Passive Optical Network).

2. Discussion of the Background Art

An optical subscriber system using a passive double star configuration has high economic efficiency and is widely used worldwide as a GE-PON system or a G-PON system, and a high-speed 10G-EPON system and an XG-PON system have also been studied.

FIGS. 1-1 and 2-1 show a configuration of a conventional optical communication system. The optical communication system is constituted of a higher-network apparatus 1, an optical line terminal (OLT) 2, an optical fiber section 3 constituted of an optical fiber 3F and an optical coupler 3C, optical network units (ONU) 4-1, 4-2, . . . , and 4-N, and lower-network apparatus 5-1, 5-2, . . . , and 5-N.

The OLT 2 is connected to the lower network of the higher-network apparatus 1. The ONUs 4-1, 4-2, . . . , and 4-N are connected respectively to higher network of the lower-network apparatus 5-1, 5-2, . . . , and 5-N. The optical fiber section 3 connects the OLT 2 to the ONUs 4-1, 4-2, . . . , and 4-N.

In the optical fiber section 3, a portion between the OLT 2 and the optical coupler 3C is shared by the ONUs 4-1, 4-2, . . . , and 4-N. Thus, in a downlink direction from the higher-network apparatus 1 to the lower-network apparatus 5, TDM (Time Division Multiplexing) communication is performed, and meanwhile, in an uplink direction from the lower-network apparatus 5 to the higher-network apparatus 1, TDMA (Time Division Multiple Access) communication is performed.

In the uplink direction, to prevent uplink data from the ONUs 4-1, 4-2, . . . , and 4-N from conflicting with each other and to suitably allocate a bandwidth to the ONUs 4-1, 4-2, . . . , and 4-N, a dynamic bandwidth allocation (DBA) technology is realized (see Non Patent Literature 1).

FIGS. 1-2 and 2-2 each show a time chart showing an uplink data transfer procedure in the conventional art. Each of the lower-network apparatus 5 transmits uplink data to each of the ONUs 4. Each of the ONUs 4 buffers the uplink data and notifies the OLT 2 of an uplink data amount as a Report packet.

The OLT 2 allocates a transmission time and a transmission permission amount of uplink data to each of the ONUs 4 based on the Report packet of each of the ONUs 4. The OLT 2 then notifies each of the ONUs 4 of the transmission time and the transmission permission amount of the uplink data as a Gate packet.

Each of the ONUs 4 transmits the uplink data to the OLT 2 based on the received Gate packet. Thus, the uplink data from each of the ONUs 4 can be efficiently transmitted to the OLT 2 based on a required bandwidth without conflicting with each other.

CITATION LIST

Non Patent Literature

[Non Patent Literature 1]
"Technical Fundamentals Lecture, GE-PON Technology, 3rd DBA Function", NTT Technical Journal, pp. 67-70, October 2005.

[Non Patent Literature 2]
A. Larmo et al., "The LTE Link-Layer Design", IEEE Communications Magazine, pp. 52-59, April 2009.

[Non Patent Literature 3]
"UMTS Long Term Evolution (LTE) Technology Introduction", Rohde & Schwarz Application Note, 1MA111, 2008.

[Non Patent Literature 4]
CPRI Specification V5.0, 2011.

In LTE (Long Term Evolution)™ as a recently introduced mobile radio communication service and LTE™-advanced that is an evolution system of LTE™, to efficiently use finite frequency resources, a cell size is minimized, and, at the same time, a cooperative transmission technique and an interference avoidance technique between a plurality of radio base stations are effectively utilized.

As shown in FIGS. 1-3 and 2-3, some of functions of the radio base station are divided into a base station device B (Base Band Unit (BBU)) and a radio device R (Remote Radio Head (RRH)), and these devices are connected to each other through an optical digital interface P, whereby the cooperative transmission technique and the interference avoidance technique are realized.

Accordingly, since the number of the radio base stations significantly increases, it is important in terms of economic efficiency to efficiently store the radio base stations in an optical access network like a PON system. At this time, the base station device B corresponds to the higher-network apparatus 1, the radio device R corresponds to the lower-network apparatus 5, and the OLT 2, the optical fiber section 3, and the ONU 4 are applied as the PON system.

In the storage of the radio base stations, since in a baseband bandwidth of the radio base station the data rate is approximately 300 Mb/s in LTE™, the existing PON system can correspond to the storage of the radio base stations, and in a required bandwidth (Gb/s order) between the base station device B and the radio device R, although the number of ONUs to be stored is limited, a high-speed system such as 10G-EPON can correspond to the storage of the radio base stations.

Meanwhile, the conditions required for a delay time between the base station device B and the radio device R are severe. Namely, as shown in FIGS. 1-4 and 2-4, in LTE™, data transmission, response (ACK/NACK), and data retransmission are required to be performed per 8 ms in retransmission control (HARQ) (see Non Patent Literature 2). Thus, an allowable one-way delay time including processing time in the base station device B or the radio device R is required to be not more than 4 ms, and the allowable one-way delay time in a PON section excluding the processing time in the base station device B or the radio device R is less than 1 ms.

In a downlink direction, since communication is performed in TDM, propagation delay in the optical fiber section 3 becomes dominant due to adjustment of a data transmission timing from the base station device B to the radio device R, whereby the one-way delay time in the PON section can be made less than 1 ms.

On the other hand, in an uplink direction, since in bandwidth allocation based on conventional DBA, a control packet (a Report packet and a Gate packet) is exchanged between the OLT 2 and the ONU 4, it takes a time of not less than 1 ms from data arrival at the ONU 4 to data output from the OLT 2. Accordingly, the existing PON system cannot be applied to a remote radio head system.

Thus, in order to solve the above problems, an object of the present disclosure is to, in a communication system constituted of a higher-network apparatus and a lower-network apparatus connected through a PON system such as a remote radio head system, transfer uplink data at high speed from the lower-network apparatus to the higher-network apparatus as to meet severe conditions required for a delay time between the higher-network apparatus and the lower-network apparatus.

SUMMARY

In order to achieve the above object, in a first disclosure, an OLT does not perform uplink bandwidth control in a PON section based on the capacity of data of uplink communication notified from an ONU and received by the ONU from a lower-network apparatus, and instead a higher-network apparatus performs the uplink bandwidth control in the PON section based on scheduling for uplink communication previously performed by the device itself with respect to the lower-network apparatus.

More specifically, the present disclosure is an optical communication system characterized by including one or a plurality of optical network units, an optical line terminal connected to the one or a plurality of optical network units through an optical fiber and an optical coupler, one or a plurality of lower-network apparatus connected to the lower level of each of the optical network units, and a higher-network apparatus connected to the higher network of the optical line terminal, performing scheduling for uplink communication from each of the lower-network apparatus to the device itself with respect to each of the lower-network apparatus, calculating a transmission time and a transmission permission amount of uplink data transmitted from each of the optical network units to the optical line terminal based on the scheduling, and notifying the optical line terminal of the transmission time and the transmission permission amount of the uplink data.

Further, the present disclosure is an optical communication method characterized by including a scheduling execution process of performing scheduling for uplink communication from each of one or a plurality of lower-network apparatus to a higher-network apparatus with respect to the lower-network apparatus communicating with the device itself and an uplink data transmission permission process in which the higher-network apparatus calculates a transmission time and a transmission permission amount of uplink data transmitted from an optical network unit to the optical line terminal based on the scheduling and notifies the optical line terminal, which is an optical line terminal connected to the lower network of the apparatus itself and is connected to one or a plurality of the optical network units, connected to the higher network of each of the lower-network apparatus, through an optical fiber and an optical coupler, of the transmission time and the transmission permission amount of the uplink data.

Furthermore, the present disclosure is a higher-network apparatus characterized by including a scheduling execution part which performs scheduling for uplink communication from a lower-network apparatus to the device itself with respect to one or a plurality of the lower-network apparatus communicating with the device itself and an uplink data transmission permission part which calculates a transmission time and a transmission permission amount of uplink data transmitted from an optical network unit to an optical line terminal based on the scheduling and notifies the optical line terminal, which is an optical line terminal connected to the lower network of the apparatus itself and is connected to one or a plurality of the optical network units, connected to the higher network of each of the lower-network apparatus, through an optical fiber and an optical coupler, of the transmission time and the transmission permission amount of the uplink data.

According to the above constitution, the OLT does not finally perform the uplink bandwidth control in the PON section after the ONU has received data of uplink communication from the lower-network apparatus, and instead the higher-network apparatus previously performs the uplink bandwidth control in the PON section before the ONU receives the data of uplink communication from the lower-network apparatus.

Thus, in a communication system constituted of a higher-network apparatus and a lower-network apparatus connected through a PON system, uplink data from the lower-network apparatus to the higher-network apparatus can be transferred at high speed so as to meet severe conditions required for a delay time between the higher-network apparatus and the lower-network apparatus.

Furthermore, the present disclosure is an optical communication system characterized in that the higher-network apparatus calculates a transmission time and a transmission permission amount of uplink data transmitted from each of the optical network units to the optical line terminal based on information on a delay time between each of the optical network units and the optical line terminal obtained from the optical line terminal and notifies the optical line terminal of the transmission time and the transmission permission amount of the uplink data.

Furthermore, the present disclosure is an optical communication method characterized in that, in the uplink data transmission permission process, a transmission time and a transmission permission amount of uplink data transmitted from each of the optical network units to the optical line terminal are calculated based on information on a delay time between each of the optical network units and the optical line terminal obtained from the optical line terminal, and the transmission time and the transmission permission amount of the uplink data are notified to the optical line terminal.

Furthermore, the present disclosure is a higher-network apparatus characterized in that the uplink data transmission permission part calculates a transmission time and a transmission permission amount of uplink data transmitted from each of the optical network units to the optical line terminal based on information on a delay time between each of the optical network units and the optical line terminal obtained from the optical line terminal and notifies the optical line terminal of the transmission time and the transmission permission amount of the uplink data.

When the higher-network apparatus calculates the transmission time and the transmission permission amount of the uplink data transmitted from the ONU to the OLT, the higher-network apparatus requires the information on the delay time between the ONU and the OLT.

According to the above constitution, the higher-network apparatus obtains the information on the delay time between the ONU and the OLT from the OLT to calculate the transmission time and the transmission permission amount of the uplink data transmitted from the ONU to the OLT, and, thus, to notify the OLT of the transmission time and the transmission permission amount of the uplink data.

Furthermore, the present disclosure is an optical communication system characterized in that the one or plurality of lower-network apparatus are one or a plurality of radio devices in a remote radio head system, and the higher-network apparatus is a base station device in the remote radio head system.

Furthermore, the present disclosure is an optical communication method characterized in that the one or a plurality of lower-network apparatus are one or a plurality of radio devices in a remote radio head system, and the higher-network apparatus is a base station device in the remote radio head system.

According to the above constitution, the optical communication system, the optical communication method, and the higher-network apparatus of the present disclosure can be applied to the remote radio head system where conditions required for a delay time between the base station device and the radio device are severe.

In order to achieve the above object, in a second disclosure, an OLT does not perform uplink bandwidth control in a PON section based on the capacity of data of uplink communication notified from an ONU and received by the ONU from a lower-network apparatus, and instead a higher-network apparatus performs the uplink bandwidth control in the PON section based on scheduling for uplink communication notified from the higher-network apparatus and previously performed by the higher-network apparatus with respect to the lower-network apparatus.

More specifically, the present disclosure is an optical communication system characterized by including one or a plurality of lower-network apparatus, a higher-network apparatus which communicates with the one or a plurality of lower-network apparatus and performs scheduling for uplink communication from each of the lower-network apparatus to the device itself with respect to each of the lower-network apparatus, one or a plurality of optical network units which are connected to the higher network of each of the lower-network apparatus, an optical line terminal which is connected to the lower level of the higher-network apparatus and, at the same time, connected to the one or a plurality of optical network units through an optical fiber and an optical coupler, receives notification of the scheduling for uplink communication from the higher-network apparatus, calculates a transmission time and a transmission permission amount of uplink data transmitted from each of the optical network units to the device itself based on the scheduling for uplink communication, and notifies each of the optical network units of the transmission time and the transmission permission amount of the uplink data.

Furthermore, the present disclosure is an optical communication method characterized by including a scheduling execution process of performing scheduling for uplink communication from each of one or a plurality of lower-network apparatus to a higher-network apparatus with respect to the lower-network apparatus communicating with the device itself, a scheduling notification process in which the higher-network apparatus notifies an optical line terminal, connected to the lower network of the apparatus itself, of the scheduling for uplink communication, and a transmission permission process in which the optical line terminal calculates a transmission time and a transmission permission amount of uplink data transmitted from an optical network unit to the device itself based on the scheduling for uplink communication and notifies one or a plurality of the optical network units, connected to the higher network of each of the lower-network apparatus and, at the same time, connected to the device itself through an optical fiber and an optical coupler, of the transmission time and the transmission permission amount of the uplink data.

The present disclosure is an optical line terminal characterized by including a higher-network-side communication part which is an interface for a higher-network apparatus connected to the higher network of the device itself, a lower-network-side communication part which is connected to the higher network of one or a plurality of lower-network apparatus communicating with the higher-network apparatus and is an interface for one or a plurality of optical network units connected to the device itself through an optical fiber and an optical coupler, an uplink bandwidth information reception part which obtains, from the higher-network apparatuscheduling for uplink communication from each of the lower-network apparatus to the higher-network apparatus performed by the higher-network apparatus with respect to each of the lower-network apparatus, and an uplink data transmission permission part which calculates a transmission time and a transmission permission amount of uplink data transmitted from each of the optical network units to the device itself based on the scheduling for uplink communication and notifies each of the optical network units of the transmission time and the transmission permission amount of the uplink data.

According to the above constitution, the OLT does not finally perform the uplink bandwidth control in the PON section after the ONU has received data of uplink communication from the lower-network apparatus, and instead the ONU previously performs uplink bandwidth control in the PON section before the ONU receives the data of uplink communication from the lower-network apparatus.

Thus, in the communication system constituted of the higher-network apparatus and the lower-network apparatus connected through the PON system, the uplink data from the lower-network apparatus to the higher-network apparatus can be transferred at high speed so as to meet severe conditions required for the delay time between the higher-network apparatus and the lower-network apparatus.

Furthermore, the present disclosure is an optical communication system characterized in that the optical line terminal does not wait for notification of a transmission request amount of the uplink data from each of the optical network units and instead notifies each of the optical network units of the transmission time and the transmission permission amount of the uplink data.

Furthermore, the present disclosure is an optical communication method characterized in that, in the transmission permission process, the optical line terminal does not wait for notification of a transmission request amount of the uplink data from each of the optical network units and instead notifies each of the optical network units of the transmission time and the transmission permission amount of the uplink data.

Furthermore, the present disclosure is an optical line terminal characterized in that the uplink data transmission permission part does not wait for notification of a transmission request amount of the uplink data from each of the optical network units and instead notifies each of the optical network units of the transmission time and the transmission permission amount of the uplink data.

According to the above constitution, the OLT performs the uplink bandwidth control in the PON section immediately after the scheduling for uplink communication previously performed by the higher-network apparatus with respect to the lower-network apparatus has been notified from the higher-network apparatus.

Thus, in the communication system constituted of the higher-network apparatus and the lower-network apparatus connected through the PON system, the uplink data from the lower-network apparatus to the higher-network apparatus can be transferred at higher speed so as to meet severe conditions required for the delay time between the higher-network apparatus and the lower-network apparatus.

Further, the present disclosure is an optical communication system characterized in that the optical line terminal calculates the transmission request amount of the uplink data, considered to have been notified from each of the optical network units, based on the scheduling for uplink communication and calculates the transmission time and the transmission permission amount of the uplink data based on the transmission request amount of the uplink data.

Furthermore, the present disclosure is an optical communication method characterized in that, in the transmission permission process, the optical line terminal calculates the transmission request amount of the uplink data, considered to have been notified from each of the optical network units, based on the scheduling for uplink communication and calculates the transmission time and the transmission permission amount of the uplink data based on the transmission request amount of the uplink data.

The present disclosure is an optical line terminal characterized in that the uplink data transmission permission part calculates the transmission request amount of the uplink data, considered to have been notified from each of the optical network units, based on the scheduling for uplink communication and calculates the transmission time and the transmission permission amount of the uplink data based on the transmission request amount of the uplink data.

According to the above constitution, the uplink data from the lower-network apparatus to the higher-network apparatus can be transferred at high speed so as to meet severe conditions required for the delay time between the higher-network apparatus and the lower-network apparatus.

Further, the present disclosure is an optical communication system characterized in that the optical line terminal notifies each of the optical network units of the scheduling for uplink communication, each of the optical network units calculates a transmission request amount of the uplink data based on the scheduling for uplink communication and notifies the optical line terminal of the transmission request amount of the uplink data, and the optical line terminal calculates the transmission time and the transmission permission amount of the uplink data based on the transmission request amount of the uplink data and notifies each of the optical network units of the transmission time and the transmission permission amount of the uplink data.

The present disclosure is an optical communication method characterized in that, in the transmission permission process, the optical line terminal notifies each of the optical network units of the scheduling for uplink communication, each of the optical network units calculates the transmission requires amount of the uplink data based on the scheduling for uplink communication and notifies the optical line terminal of the transmission request amount of the uplink data, and the optical line terminal calculates the transmission time and the transmission permission amount of the uplink data based on the transmission request amount of the uplink data and notifies each of the optical network units of the transmission time and the transmission permission amount of the uplink data.

Further, the present disclosure is an optical line terminal characterized in that the uplink data transmission permission part notifies each of the optical network units of the scheduling for uplink communication, obtains a transmission request amount of the uplink data, calculated based on the scheduling for uplink communication, from each of the optical network units, calculates the transmission time and the transmission permission amount of the uplink data based on the transmission request amount of the uplink data, and notifies each of the optical network units of the transmission time and the transmission permission amount of the uplink data.

According to the above constitution, the uplink data from the lower-network apparatus to the higher-network apparatus can be transferred at high speed so as to meet severe conditions required for the delay time between the higher-network apparatus and the lower-network apparatus.

Further, the present disclosure is an optical communication system characterized by further including a proxy device which serves as each of the optical network units, and in the optical communication system, the optical line terminal notifies the proxy device of the scheduling for uplink communication, the proxy device calculates the transmission request amount of the uplink data based on the scheduling for uplink communication and notifies the optical line terminal of the transmission request amount of the uplink data, and the optical line terminal calculates the transmission time and the transmission permission amount of the uplink data based on the transmission request amount of the uplink data and notifies each of the optical network units of the transmission time and the transmission permission amount of the uplink data.

Further, the present disclosure is an optical communication method characterized in that, in the transmission permission process, the optical line terminal notifies a proxy device, which serves as each of the optical network units, of the scheduling for uplink communication, the proxy device calculates the transmission request amount of the uplink data based on the scheduling for uplink communication and notifies the optical line terminal of the transmission request amount of the uplink data, and the optical line terminal calculates the transmission time and the transmission permission amount of the uplink data based on the transmission request amount of the uplink data and notifies each of the optical network units of the transmission time and the transmission permission amount of the uplink data.

Furthermore, the present disclosure is an optical line terminal characterized in that the uplink data transmission permission part notifies a proxy device, which serves as each of the optical network units, of the scheduling for uplink communication, obtains the transmission request amount of the uplink data, calculated based on the scheduling for uplink communication, from the proxy device, calculates the transmission time and the transmission permission amount of the uplink data based on the transmission request amount of the uplink data, and notifies each of the optical network units of the transmission time and the transmission permission amount of the uplink data.

According to the above constitution, since the proxy device is installed physically near the OLT as compared with each of the ONUs, the transmission duration of a bandwidth information packet can be reduced.

Further, the present disclosure is an optical communication system characterized by including one or a plurality of lower-network apparatus, a higher-network apparatus which communicates with the one or a plurality of lower-network apparatus and performs scheduling for uplink communication from each of the lower-network apparatus to the device itself with respect to each of the lower-network apparatus, one or a plurality of optical network units which are connected to the higher network of each of the lower-network apparatus, a proxy device which serves as each of the optical network units, receives notification of the scheduling for uplink communication from the higher-network apparatus, and calculates a transmission request amount of uplink data from each of the optical network units based on the scheduling for uplink communication, and an optical line terminal which is connected to the lower level of the higher-network apparatus and, at the same time, connected to the one or a plurality of optical network units through an optical fiber and an optical coupler, receives notification of the transmission request amount of the uplink data from the proxy device, calculates a transmission time and a transmission permission amount of uplink data transmitted from each of the optical network units to the device itself based on the transmission request amount of the uplink data, and notifies each of the optical network units of the transmission time and the transmission permission amount of the uplink data.

Furthermore, the present disclosure is an optical communication method characterized by including in order a scheduling execution process in which a higher-network apparatus performs, with respect to one or a plurality of lower-network apparatus communicating with the device itself, scheduling for uplink communication from each of the lower-network apparatus to the device itself, a scheduling notification process in which the higher-network apparatus notifies a proxy device, which serves as one or a plurality of optical network units connected to the higher network of each of the lower-network apparatus, of the scheduling for uplink communication, a transmission request process in which the proxy device calculates a transmission request amount of uplink data transmitted from each of the optical network units to an optical line terminal and notifies the optical line terminal, which is connected to the lower level of the higher-network apparatus and, at the same time, connected to the one or a plurality of optical network units through an optical fiber and an optical coupler, of the transmission request amount of the uplink data, and a transmission permission process in which the optical line terminal calculates a transmission time and a transmission permission amount of uplink data transmitted from each of the optical network units to the device itself based on the transmission request amount of the uplink data and notifies each of the optical network units of the transmission time and the transmission permission amount of the uplink data.

Furthermore, the present disclosure is an optical line terminal characterized by including a higher-network-side communication part which is an interface for a higher-network apparatus connected to the higher network of the apparatus itself, a lower-network-side communication part which is connected to the higher network of one or a plurality of lower-network apparatus communicating with the higher-network apparatus and is an interface for one or a plurality of optical network units connected to the device itself through an optical fiber and an optical coupler, and an uplink data transmission permission part which obtains a transmission request amount of uplink data transmitted from each of the optical network units to the device itself, calculated based on scheduling for uplink communication from each of the lower-network apparatus to the higher-network apparatus performed by the higher-network apparatus with respect to each of the lower-network apparatus, from a proxy device which serves as each of the optical network units, calculates a transmission time and a transmission permission amount of uplink data transmitted from each of the optical network units to the device itself based on the transmission request amount of the uplink data, and notifies each of the optical network units of the transmission time and the transmission permission amount of the uplink data.

According to the above constitution, since the proxy device is connected directly to the higher-network apparatus not through the OLT, the transmission duration of a bandwidth information packet can be reduced.

Further, the present disclosure is an optical communication system characterized in that the one or a plurality of lower-network apparatus are one or a plurality of radio devices in a remote radio head system, and the higher-network apparatus is a base station device in the remote radio head system.

Furthermore, the present disclosure is an optical communication method characterized in that the one or a plurality of lower-network apparatus are one or a plurality of radio devices in a remote radio head system, and the higher-network apparatus is a base station device in the remote radio head system.

Furthermore, the present disclosure is an optical line terminal characterized in that the one or a plurality of lower-network apparatus are one or a plurality of radio devices in the remote radio head system, and the higher-network apparatus is a base station device in the remote radio head system.

According to the above constitution, the optical communication system, the optical communication method, and the optical line terminal of the present disclosure can be applied to the remote radio head system where conditions required for a delay time between a base station device and a radio device are severe.

Advantageous Effects of Disclosure

According to the first and second disclosures, in a communication system constituted of a higher-network apparatus and a lower-network apparatus connected through a PON system such as a remote radio head system, uplink data can be transferred at high speed from the lower-network apparatuso as to meet severe conditions required for a delay time between the higher-network apparatus and the lower-network apparatus.

BRIEF DESCRIPTION OF THE DRAWINGS

FIG. 1-2 is a time chart showing an uplink data transfer procedure in the conventional art;

FIG. 1-3 is a view showing a configuration of a base station in a remote radio head system;

FIG. 1-4 is a time chart showing retransmission control in an LTE™ system;

FIG. 1-5 is a view showing a configuration of an optical communication system of a first embodiment according to a first disclosure;

FIG. 1-6 is a time chart showing an uplink data transfer procedure of the first embodiment according to the first disclosure;

FIG. 1-7 is a view showing a configuration of an optical communication system of a second embodiment according to the first disclosure;

FIG. 1-8 is a time chart showing an uplink data transfer procedure of the second embodiment according to the first disclosure;

FIG. 1-9 is a view showing an interface demarcation point between a base station device and a radio device;

FIG. 2-1 is a view showing a configuration of an optical communication system in the conventional art;

FIG. 2-2 is a time chart showing an uplink data transfer procedure in the conventional art;

FIG. 2-3 is a view showing a configuration of a base station in the remote radio head system;

FIG. 2-4 is a time chart showing retransmission control in the LTE™ system;

FIG. 2-5 is a view showing a configuration of an optical communication system of a 2-1st embodiment according to a second disclosure;

FIG. 2-6 is a time chart showing an uplink data transfer procedure of the 2-1st embodiment according to the second disclosure;

FIG. 2-7 is a view showing a configuration of an optical communication system of a 2-2nd embodiment according to the second disclosure;

FIG. 2-8 is a time chart showing an uplink data transfer procedure of the 2-2nd embodiment according to the second disclosure;

FIG. 2-9 is a view showing a configuration of an optical communication system of a 2-3rd embodiment according to the second disclosure;

FIG. 2-10 is a time chart showing an uplink data transfer procedure of the 2-3rd embodiment according to the second disclosure;

FIG. 2-11 is a view showing a configuration of an optical communication system of a 2-4th embodiment according to the second disclosure;

FIG. 2-12 is a time chart showing an uplink data transfer procedure of the 2-4th embodiment according to the second disclosure;

FIG. 2-13 is a view showing a configuration of an optical communication system of a 2-5th embodiment according to the second disclosure;

FIG. 2-14 is a time chart showing an uplink data transfer procedure of the 2-5th embodiment according to the second disclosure; and FIG. 2-15 is a view showing an interface demarcation point between a base station device and a radio device.

DETAILED DESCRIPTION OF THE PREFERRED EMBODIMENT

Figure 1:
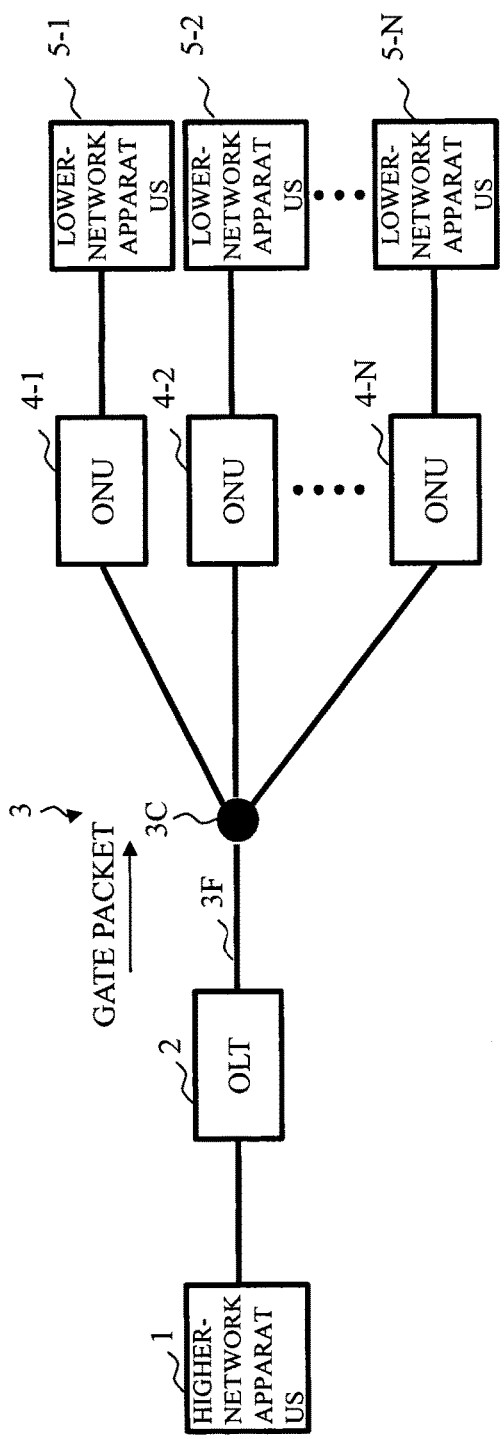
FIG. 1-1 is a view showing a configuration of an optical communication system in the conventional art.

Embodiments of the present disclosure will be described with reference to the accompanying drawings. The embodiments to be described hereinafter are examples of the present disclosure, and the present disclosure is not limited to the following embodiments. The embodiments are merely examples, and the disclosure can be implemented in various forms obtained by altering or modifying the embodiments based on the knowledge of those skilled in the art. Components denoted by the same reference numerals in the present specification and the drawings mutually denote the same components.

First Embodiment According to First Disclosure

Figures 1, 2:
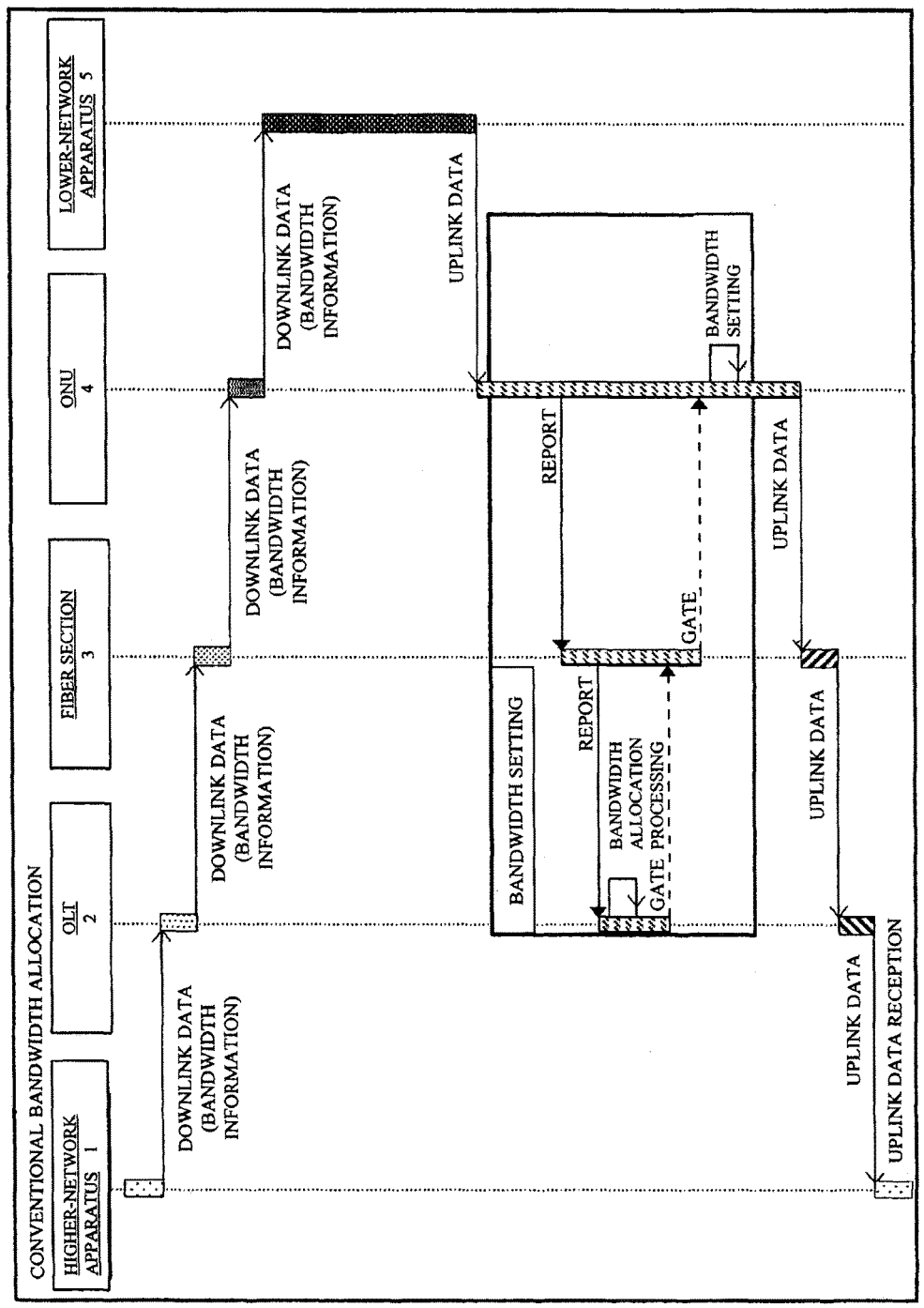
Figures 1, 2, 3:
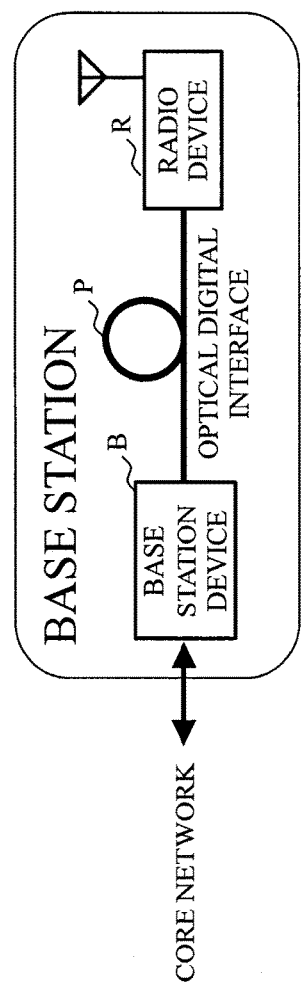
Figures 1, 2, 3, 4:
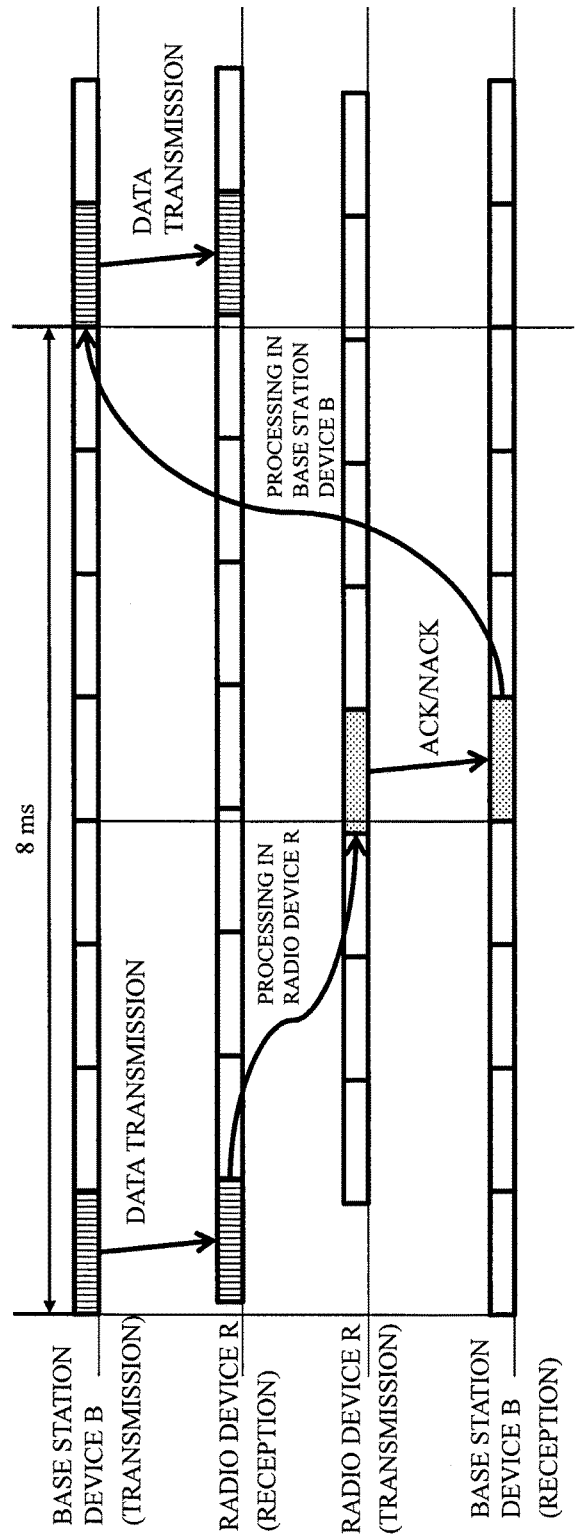
Figures 1, 2, 3, 4, 5:
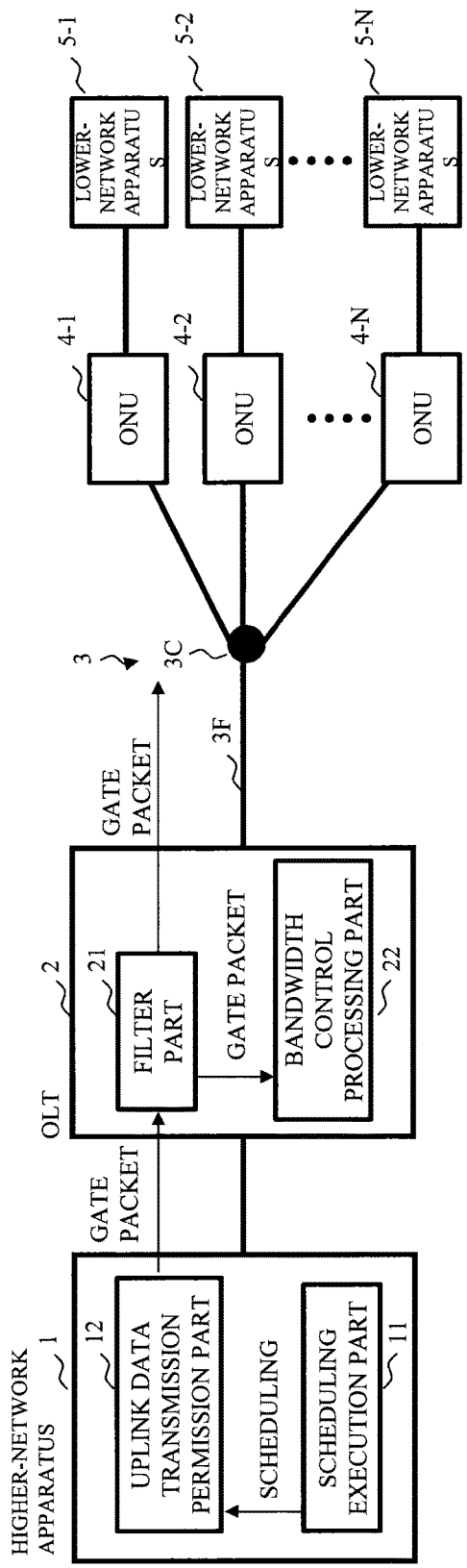

FIG. 1-5 shows a configuration of an optical communication system of a first embodiment according to a first disclosure. The optical communication system of the first embodiment according to the first disclosure is constituted of a higher-network apparatus 1, an OLT 2, an optical fiber section 3 constituted of an optical fiber 3F and an optical coupler 3C, ONUs 4-1, 4-2, ..., and 4-N, and lower-network apparatus 5-1, 5-2, ..., and 5-N. For example, in a remote radio head system, the higher-network apparatus 1 corresponds to a base station device B, and the lower-network apparatus 5 corresponds to a radio device R.

N is a natural number not less than 1, and one or a plurality of the ONUs 4 are arranged. The OLT 2 is connected to one or a plurality of the ONUs 4 through the optical fiber 3F and the optical coupler 3C. Each of the lower-network apparatus 5 is connected to the lower level of each of the ONUs 4. The higher-network apparatus 1 is connected to the higher network of the OLT 2.

The higher-network apparatus 1 performs scheduling for uplink communication from each of the lower-network apparatus 5 to the device 1 itself with respect to each of the lower-network apparatus 5, calculates a transmission time and a transmission permission amount of uplink data from each of the ONUs 4 to the OLT 2 based on the scheduling for uplink communication, and notifies the OLT 2 of the transmission time and the transmission permission amount of the uplink data.

The higher-network apparatus 1 is constituted of a scheduling execution part 11 and an uplink data transmission permission part 12. The OLT 2 is constituted of a filter part 21 and a bandwidth control processing part 22.

The scheduling execution part 11 performs scheduling for uplink communication from each of the lower-network apparatus 5 to the device 1 itself with respect to each of the lower-network apparatus 5. The uplink data transmission permission part 12 calculates the transmission time and the transmission permission amount of the uplink data transmitted from each of the ONUs 4 to the OLT 2 based on the scheduling for uplink communication, and notifies the OLT 2 of the transmission time and the transmission permission amount of the uplink data as a Gate packet.

The filter part 21 receives the Gate packet, to be transmitted to each of the ONUs 4, from the higher-network apparatus 1 and transmits the received Gate packet transmitted to each of the ONUs 4 to each of the ONUs 4. In parallel with this, the filter part 21 duplicates the Gate packet transmitted to each of the ONUs 4 and outputs the duplicated Gate packets transmitted to each of the ONUs 4 to the bandwidth control processing part 22. The bandwidth control processing part 22 receives the duplicated Gate packets transmitted to each of the ONUs 4 from the filter part 21. The bandwidth control processing part 22 then aggregates the duplicated Gate packets transmitted to each of the ONUs 4 to create bandwidth allocation information of the entire PON section. Subsequently, the bandwidth control processing part 22 receives the uplink data transmitted from each of the ONUs 4 to the device 2 itself based on the bandwidth allocation information of the entire PON section.

Figures 1, 2, 3, 4, 5, 6:
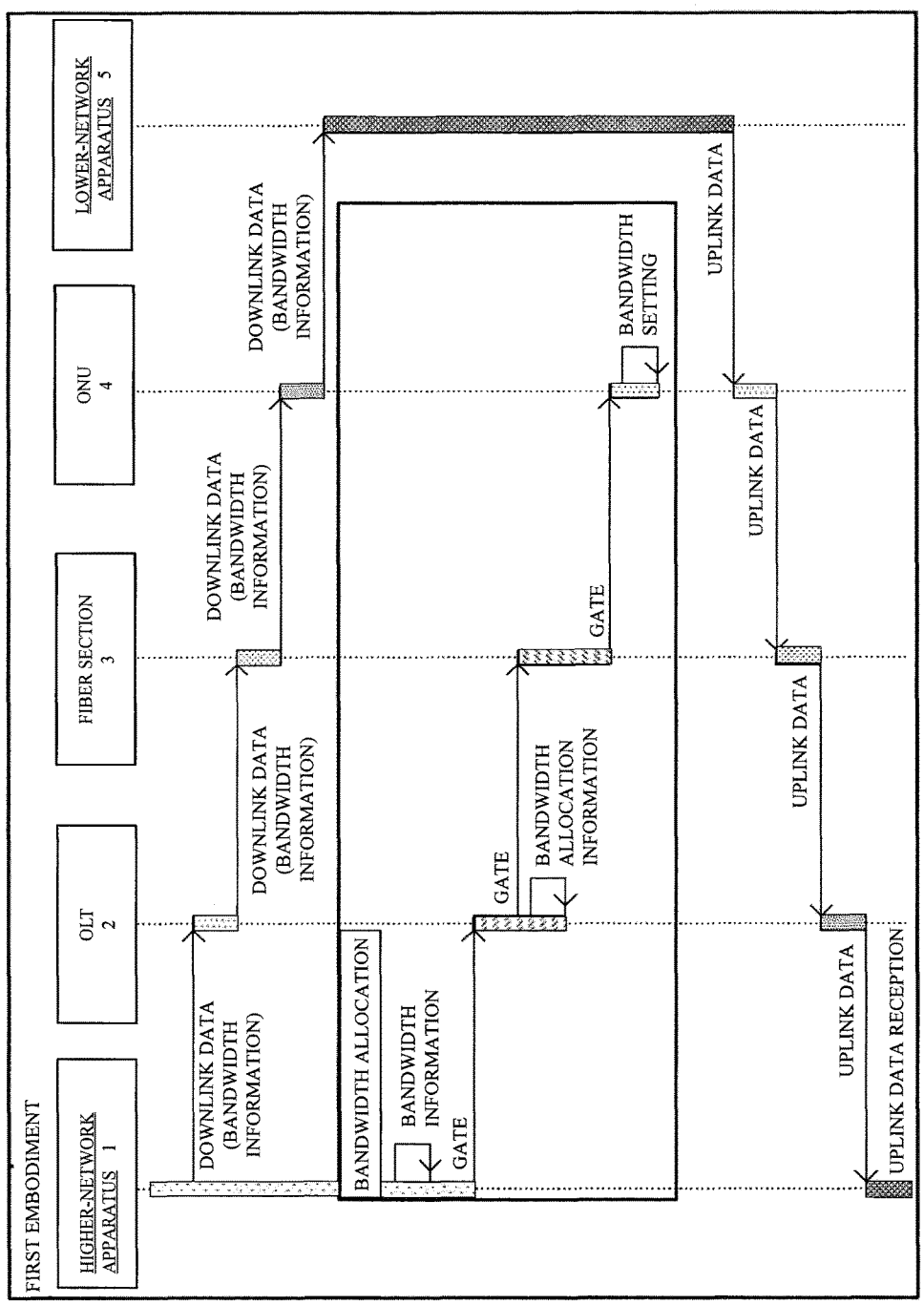

FIG. 1-6 is a time chart showing an uplink data transfer procedure of the first embodiment according to the first disclosure. In the higher-network apparatus 1, the scheduling execution part 11 transmits, as a portion of downlink data, bandwidth information of scheduling for uplink communication from each of the lower-network apparatus 5 to the device 1 itself to each of the lower-network apparatus 5 through the OLT 2, the fiber section 3, and each of the ONUs 4.

In parallel with the transmission processing for bandwidth information of uplink communication, in the higher-network apparatus 1, the uplink data transmission permission part 12 calculates the transmission time and the transmission permission amount of the uplink data transmitted from each of the ONUs 4 to the OLT 2 based on the scheduling for uplink communication. Then, the higher-network apparatus 1 transmits the Gate packet to each of the ONUs 4 through the OLT 2 and the fiber section 3. Each of the ONUs 4 receives the Gate packet from the higher-network apparatus 1 through the OLT 2 and the fiber section 3. Subsequently, each of the ONUs 4 performs uplink bandwidth setting in the PON section based on the Gate packet.

In parallel with the transmission processing for the Gate packet, in the OLT 2, the filter part 21 duplicates the Gate packet transmitted to each of the ONUs 4. Then, in the OLT 2, the bandwidth control processing part 22 waits for reception of uplink data based on the bandwidth allocation information of the entire PON section.

After the above processing, each of the ONUs 4 transmits the uplink data, which has been received from each of the lower-network apparatus 5, to the OLT 2 through the optical fiber section 3 based on the uplink bandwidth setting in the PON section. Then, the OLT 2 receives the uplink data, which has been transmitted from each of the lower-network apparatus 5, from each of the ONUs 4 through the optical fiber section 3 based on the bandwidth allocation information of the entire PON section. The OLT 2 transmits the uplink data, which has been received from each of the lower-network apparatus 5, to the higher-network apparatus 1.

Second Embodiment According to First Disclosure

Figures 1, 2, 3, 4, 5, 6, 7:
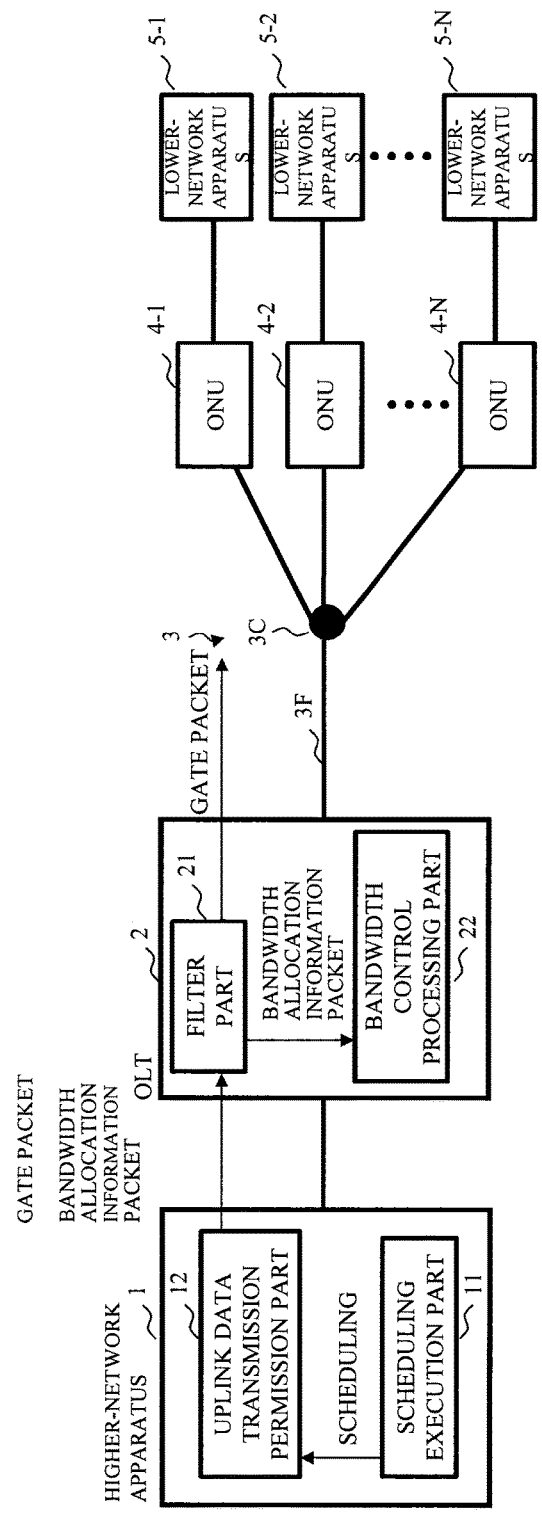

FIG. 1-7 shows a configuration of an optical communication system of a second embodiment according to the first disclosure. In the first embodiment according to the first disclosure, the OLT 2 creates the bandwidth allocation information of the entire PON section, and meanwhile, in the second embodiment according to the first disclosure, a higher-network apparatus 1 creates bandwidth allocation information of an entire PON section. Thus, in comparing the second embodiment according to the first disclosure with the first embodiment according to the first disclosure, although the second embodiment according to the first disclosure has similar components to those of the first embodiment, these embodiments are different in processing distribution, and although a traffic amount between the higher-network apparatus 1 and an OLT 2 is increased by an amount of transmission of the bandwidth allocation information of the entire PON section, a processing amount in a filter part 21 and a bandwidth control processing part 22 of the OLT 2 is reduced by an amount of duplication of a Gate packet transmitted to each ONU 4 and by an amount of creation of the bandwidth allocation information of the entire PON section.

A scheduling execution part 11 performs scheduling for uplink communication from each lower-network apparatus 5 to the device 1 itself with respect to each of the lower-network apparatus 5. An uplink data transmission permission part 12 calculates a transmission time and a transmission permission amount of uplink data transmitted from each of the ONUs 4 to the OLT 2 based on the scheduling for uplink communication and notifies the OLT 2 of the transmission time and the transmission permission amount of the uplink data as a Gate packet. In parallel with this, the uplink data transmission permission part 12 aggregates the Gate packets transmitted to each of the ONUs 4 to create the bandwidth allocation information of the entire PON section, and, thus, to transmit the bandwidth allocation information to the OLT 2.

The filter part 21 receives the Gate packet transmitted to each of the ONUs 4 and the bandwidth allocation information of the entire PON section from the higher-network apparatus 1. The filter part 21 then transmits the received Gate packet transmitted to each of the ONUs 4 to each of the ONUs 4 and outputs the bandwidth allocation information of the entire PON section to the bandwidth control processing part 22. The bandwidth control processing part 22 receives an input of the bandwidth allocation information of the entire PON section from the filter part 21. The bandwidth control processing part 22 then receives the uplink data transmitted from each of the ONUs 4 to the device 2 itself based on the bandwidth allocation information of the entire PON section.

Figures 1, 2, 3, 4, 5, 6, 7, 8:
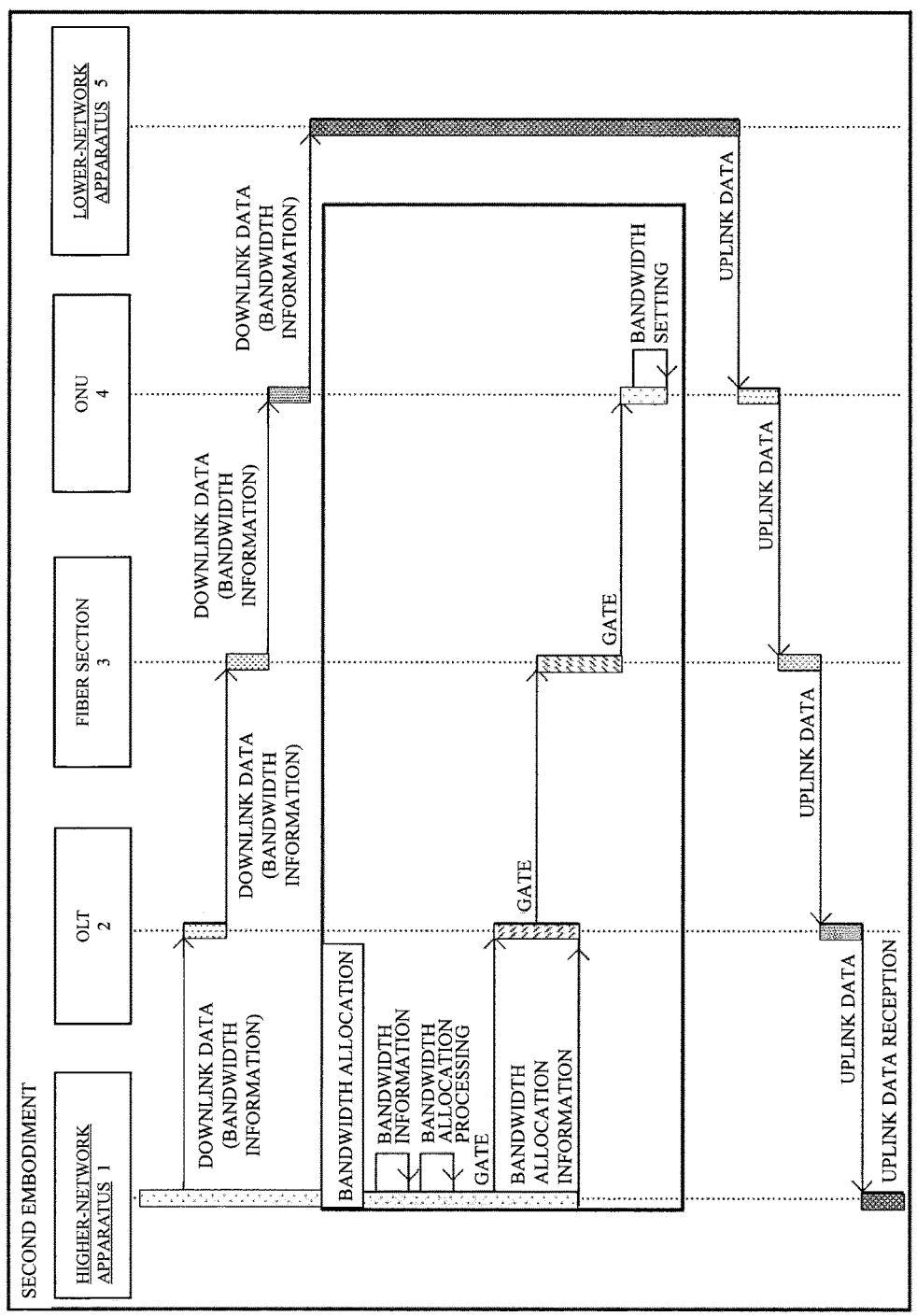

FIG. 1-8 is a time chart showing an uplink data transfer procedure of the second embodiment according to the first disclosure. In the higher-network apparatus 1, the scheduling execution part 11 transmits, as a portion of downlink data, bandwidth information of scheduling for uplink communication from each of the lower-network apparatus 5 to the device 1 itself to each of the lower-network apparatus 5 through the OLT 2, the fiber section 3, and each of the ONUs 4.

In parallel with the transmission processing for bandwidth information of uplink communication, in the higher-network apparatus 1, the uplink data transmission permission part 12 calculates the transmission time and the transmission permission amount of the uplink data transmitted from each of the ONUs 4 to the OLT 2 based on the scheduling for uplink communication. Then, the higher-network apparatus 1 transmits the Gate packet to each of the ONUs 4 through the OLT 2 and the fiber section 3. Each of the ONUs 4 receives the Gate packet from the higher-network apparatus 1 through the OLT 2 and the fiber section 3. Subsequently, each of the ONUs 4 performs uplink bandwidth setting in the PON section based on the Gate packet.

In parallel with the transmission processing for the Gate packet, in the higher-network apparatus 1, the uplink data transmission permission part 12 creates the bandwidth allocation information of the entire PON section. The uplink data transmission permission part 12 then transmits the bandwidth allocation information of the entire PON section to the OLT 2. In the OLT 2, the filter part 21 receives the bandwidth allocation information of the entire PON section. Then, in the OLT 2, the bandwidth control processing part 22 waits for reception of uplink data based on the bandwidth allocation information of the entire PON section.

After the above processing, each of the ONUs 4 transmits the uplink data, which has been received from each of the lower-network apparatus 5, to the OLT 2 through the optical fiber section 3 based on the uplink bandwidth setting in the PON section. Then, the OLT 2 receives the uplink data, which has been transmitted from each of the lower-network apparatus 5, from each of the ONUs 4 through the optical fiber section 3 based on the bandwidth allocation information of the entire PON section. The OLT 2 transmits the uplink data, which has been received from each of the lower-network apparatus 5, to the higher-network apparatus 1.

Effects of Disclosures of First and Second Embodiments According to the First Disclosure As described above, in the first and second embodiments according to the first disclosure, the OLT 2 does not perform uplink bandwidth control in the PON section based on the capacity of the uplink data notified from each of the ONUs 4 and received by each of the ONUs 4 from each of the lower-network apparatus 5, and instead the higher-network apparatus 1 performs the uplink bandwidth control in the PON section based on the scheduling for uplink communication previously performed by the device 1 itself with respect to each of the lower-network apparatus 5.

Namely, the OLT 2 does not finally perform the uplink bandwidth control in the PON section after each of the ONUs 4 has received the uplink data from each of the lower-network apparatus 5, and instead the higher-network apparatus 1 previously performs the uplink bandwidth control in the PON section before each of the ONUs 4 receives the uplink data from each of the lower-network apparatus 5.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable.

The first and second embodiments according to the first disclosure can be applied to a remote radio head system, for example. For example in a remote radio head system using LTE™, since a processing delay in the first and second embodiments according to the first disclosure can be suppressed to not more than 1 ms, the bandwidth control processing can be performed so as to have a sufficient time allowance.

Third Embodiment According to the First Disclosure

In the first and second embodiments according to the first disclosure, when the higher-network apparatus 1 calculates the transmission time and the transmission permission amount of the uplink data transmitted from each of the ONUs 4 to the OLT 2, the higher-network apparatus 1 requires the information on the delay time between each of the ONUs 4 and the OLT 2 in addition to the traffic information output from each of the lower-network apparatus 5.

In a third embodiment according to the first disclosure, in addition to the configurations of the first and second embodiments according to the first disclosure, a higher-network apparatus 1 obtains the information on a delay time between each of ONUs 4 and an OLT 2 from the OLT 2 to calculate a transmission time and a transmission permission amount of uplink data transmitted from each of the ONUs 4 to the OLT 2, and, thus, to notify the OLT 2 of the transmission time and the transmission permission amount of the uplink data.

For example, in GE-PON, when MPCP (Multi-Point Control Protocol) is discovered, the OLT 2 creates and holds the information on the delay time in a PON section. Thus, the higher-network apparatus 1 can obtain the information on the delay time in the PON section from the OLT 2. Although a transmission method includes a method using a dedicated control line and a method of performing packet transmission between the higher-network apparatus 1 and the OLT 2, any implementation may be used.

(Remote Radio Head System)

The first to third embodiments according to the first disclosure can be applied to the remote radio head system, as described above. For example, in the remote radio head system using LTE™, after the base station device B transmits downlink data including a downlink control channel, the ONU 4 is required to receive transmission of bandwidth information and execute bandwidth setting within four sub frames (4 ms) (see Non Patent Literature 3). However, in the first to third embodiments according to the first disclosure, since the processing delay can be suppressed to not more than 1 ms as described above, the bandwidth control processing can be performed so as to have a sufficient time allowance.

Figures 1, 2, 3, 4, 5, 6, 7, 8, 9:
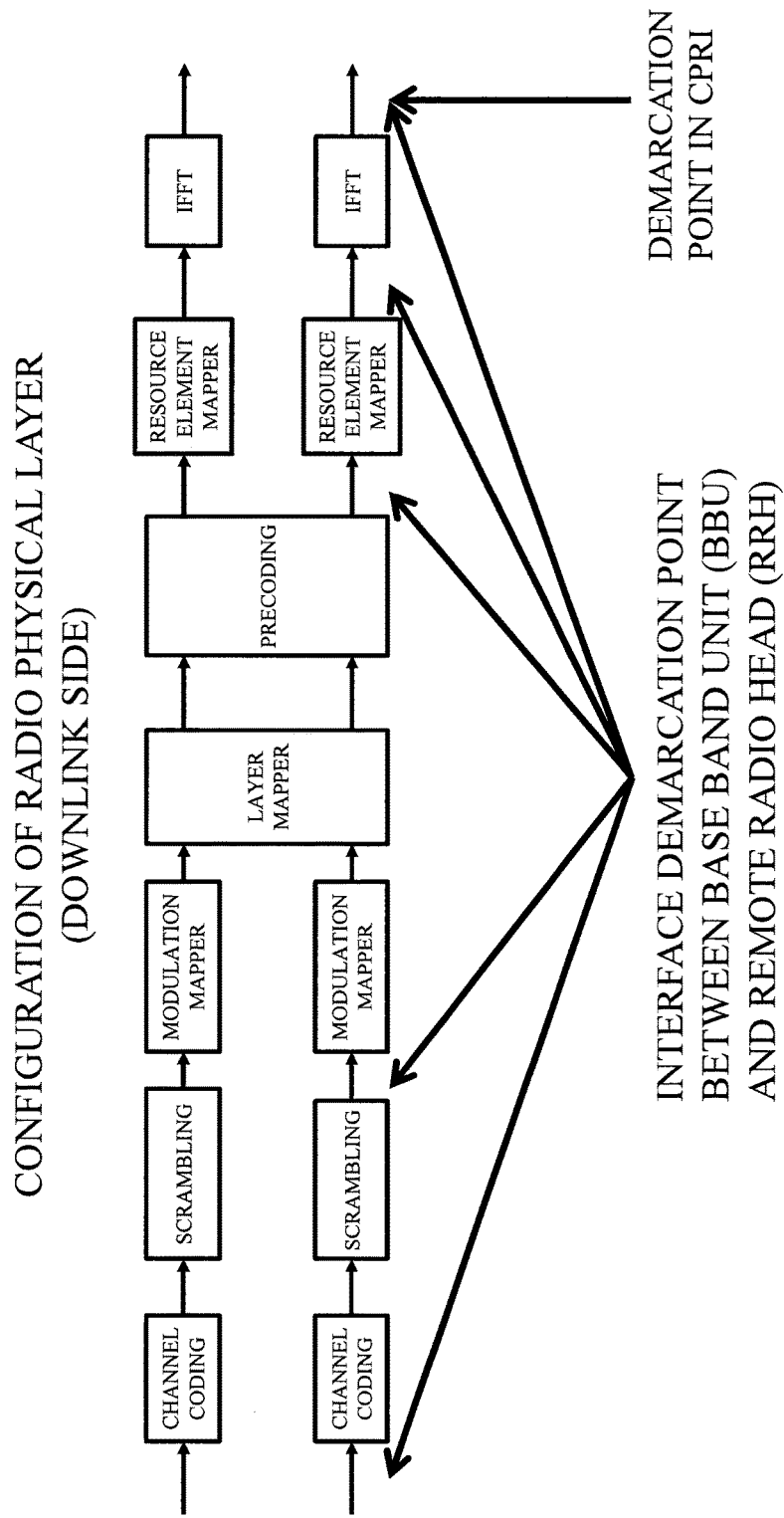

When the higher-network apparatus 1 and the lower-network apparatus 5 are respectively a base station device B (BBU) and a radio device R (RRH), an interface demarcation point between the base station device B and the radio device R is usually standardized at an IQ data point in a base band in a radio physical layer as described in CPRI (Common Public Radio Interface) (see Patent Literature 4) which is an industry standard; however, the interface demarcation point may be each point of physical layer configuration of LTE™ shown in FIG. 1-9.

Regarding the bandwidth information transmitted from the higher-network apparatus 1 to each of the lower-network apparatus 5, identification information for each of the lower-network apparatus 5 is essential, an arrival time of data transmitted from each of the lower-network apparatus 5 to each of the ONUs 4 and data length are essential, and other management information is added.

The first disclosure is not limited to the disclosure according to the above embodiments. For example, the first embodiment according to the first disclosure may be combined with the configuration of the second or third embodiment according to the first disclosure, or the first embodiment may be combined with the configurations of the second and third embodiments. When the first embodiment is combined with the second and third embodiments, an optical communication system includes the higher-network apparatus 1 in a remote radio head system and the lower-network apparatus 5 in the remote radio head system, and the higher-network apparatus 1 calculates and notifies the transmission time and the transmission permission amount of uplink data transmitted from each of the ONUs 4 to the OLT 2 based on the information on the delay time between each of the ONUs 4 and the OLT 2 obtained from the OLT 2. Therefore, the combination of the first embodiment with the second and third embodiments can reduce the delay time before the processing in the bandwidth control processing part 22 starts.

First Embodiment According to Second Disclosure

FIG. 2-5 shows a configuration of an optical communication system of a first embodiment according to a second disclosure. The optical communication system of the first embodiment according to the second disclosure is constituted of a higher-network apparatus 1, an OLT 2, an optical fiber section 3 constituted of an optical fiber 3F and an optical coupler 3C, ONUs 4-1, 4-2, . . . , and 4-N, and lower-network apparatus 5-1, 5-2, . . . , and 5-N. For example, in the remote radio head system, the higher-network apparatus 1 corresponds to a base station device B, and the lower-network apparatus 5 corresponds to a radio device R.

N is a natural number not less than 1, and one or a plurality of the lower-network apparatus 5 are arranged. The higher-network apparatus 1 communicates with each of the lower-network apparatus 5 and performs scheduling for uplink communication from each of the lower-network apparatus 5 to the device 1 itself with respect to each of the lower-network apparatus 5. The ONU 4 is connected to the higher network of the lower-network apparatus 5.

The OLT 2 is connected to the lower level of the higher-network apparatus 1 and, at the same time, connected to one or a plurality of the ONUs 4-1, 4-2, . . . , and 4-N through the optical fiber 3F and the optical coupler 3C.

The OLT 2 receives notification of the scheduling for uplink communication from the higher-network apparatus 1 to calculate a transmission time and a transmission permission amount of uplink data transmitted from each of the ONUs 4 to the device 2 itself based on the scheduling for uplink communication, and, thus, to notify each of the ONUs 4 of the transmission time and the transmission permission amount of the uplink data.

Here, the OLT 2 does not wait for the notification of a transmission request amount of uplink data from each of the ONUs 4 and instead notifies each of the ONUs 4 of the transmission time and the transmission permission amount of the uplink data.

The constituents of the OLT 2 will be described. The OLT 2 is constituted of a higher-network-side communication part 21, an uplink bandwidth information reception part 22, an uplink data transmission permission part 23, and a lower-network-side communication part 24.

The higher-network-side communication part 21 is an interface for the higher-network apparatus 1. The lower-network-side communication part 24 is an interface for the ONUs 4-1, 4-2, . . . , and 4-N.

The uplink bandwidth information reception part 22 obtains, from the higher-network apparatus 1, the scheduling for uplink communication from each of the lower-network apparatus 5 to the higher-network apparatus 1 performed by the higher-network apparatus 1 with respect to each of the lower-network apparatus 5. The scheduling for uplink communication is notified through the higher-network-side communication part 21.

The uplink data transmission permission part 23 calculates the transmission time and the transmission permission amount of uplink data transmitted from each of the ONUs 4 to the device 2 itself based on the scheduling for uplink communication and notifies each of the ONUs 4 of the transmission time and the transmission permission amount of the uplink data. The transmission time and the transmission permission amount of the uplink data is notified through the lower-network-side communication part 24.

Here, the uplink data transmission permission part 23 does not wait for the notification of the transmission request amount of uplink data from each of the ONUs 4 and instead notifies each of the ONUs 4 of the transmission time and the transmission permission amount of the uplink data.

FIG. 2-6 is a time chart showing an uplink data transfer procedure of the first embodiment according to the second disclosure. The higher-network apparatus 1 transmits, as a portion of downlink data, bandwidth information of scheduling for uplink communication from each of the lower-network apparatus 5 to the device 1 itself to each of the lower-network apparatus 5 through the OLT 2, the fiber section 3, and each of the ONUs 4. In parallel with this, the higher-network apparatus 1 notifies the OLT 2 of the bandwidth information of the scheduling for the uplink communication from each of the lower-network apparatus 5 to the device 1 itself.

The uplink bandwidth information reception part 22 obtains the bandwidth information of the scheduling for the uplink communication from the higher-network apparatus 1 through the higher-network-side communication part 21, and here the uplink communication is a communication from each of the lower-network apparatus 5 to the higher-network apparatus 1. The uplink data transmission permission part 23 executes the bandwidth allocation processing in a PON section based on the bandwidth information of the scheduling for the uplink communication from each of the lower-network apparatus 5 to the higher-network apparatus 1. Then, the uplink data transmission permission part 23 transmits a Gate packet for transmission of the bandwidth allocation information to each other ONUs 4 through the lower-network-side communication part 24 and the optical fiber section 3.

Each of the ONUs 4 receives the Gate packet for transmission of the bandwidth allocation information from the OLT 2 through the optical fiber section 3. Each of the ONUs 4 then executes the uplink bandwidth setting in the PON section based on the Gate packet for transmission of the bandwidth allocation information. In parallel with this, each of the lower-network apparatus 5 receives the bandwidth information of the scheduling for the uplink communication from the higher-network apparatus 1 through the OLT 2, the optical fiber section 3, and each of the ONUs 4, and here, the communication is a communication from the device 5 itself to the higher-network apparatus 1. Each of the lower-network apparatus 5 then transmits the uplink data to each of the ONUs 4 based on the bandwidth information of the scheduling for the uplink communication from the device 5 itself to the higher-network apparatus 1.

Each of the ONUs 4 transmits the uplink data, received from each of the lower-network apparatus 5, to the OLT 2 through the optical fiber section 3 based on the uplink bandwidth setting in the PON section. The OLT 2 then transmits the uplink data, received from each of the lower-network apparatus 5, to the higher-network apparatus 1.

As described above, the OLT 2 does not perform the uplink bandwidth control in the PON section based on the capacity of the uplink data notified from each of the ONUs 4, and received by each of the ONUs 4 from each of the lower-network apparatus 5, and instead performs the uplink bandwidth control in the PON section based on the scheduling for uplink communication notified from the higher-network apparatus 1 and previously performed by the higher-network apparatus 1 with respect to each of the lower-network apparatus 5.

Namely, the OLT 2 does not finally perform the uplink bandwidth control in the PON section after each of the ONUs 4 has received the uplink data from each of the lower-network apparatus 5, and instead the OLT 2 previously performs the uplink bandwidth control in the PON section before each of the ONUs 4 receives the uplink data from each of the lower-network apparatus 5.

Then, the OLT 2 performs the uplink bandwidth control in the PON section immediately after the scheduling for uplink communication previously performed by the higher-network apparatus 1 with respect to each of the lower-network apparatus 5 has been notified from the higher-network apparatus 1.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable.

The first embodiment according to the second disclosure can be applied to a remote radio head system, for example.

For example in a remote radio head system using LTE™, since a processing delay in the first embodiment according to the second disclosure can be suppressed to about 1 ms, the bandwidth control processing can be performed so as to have a sufficient time allowance.

Second Embodiment According to Second Disclosure

FIG. 2-7 shows a configuration of an optical communication system of a second embodiment according to the second disclosure. The second embodiment according to the second disclosure is different from the first embodiment according to the second disclosure, and an OLT 2 includes a Report packet generation part 25.

FIG. 2-8 is a time chart showing an uplink data transfer procedure of the second embodiment according to the second disclosure. A transmission process of transmitting bandwidth information of scheduling for uplink communication from each lower-network apparatus 5 to a higher-network apparatus 1 performed by the device 1 itself with respect to each of the lower-network apparatus 5 and the OLT 2 is similar to that in the first and second embodiments according to the second disclosure.

An uplink bandwidth information reception part 22 obtains the bandwidth information of the scheduling for the uplink communication from the higher-network apparatus 1 through a higher-network-side communication part 21, and here the uplink communication is a communication from each of the lower-network apparatus 5 to the higher-network apparatus 1. The Report packet generation part 25 generates a Report packet based on the bandwidth information of the scheduling for the uplink communication from each of the lower-network apparatus 5 to the higher-network apparatus 1.

An uplink data transmission permission part 23 executes bandwidth allocation processing in a PON section based on the Report packet generated by the Report packet generation part 25. The uplink data transmission permission part 23 then transmits a Gate packet for transmission of the bandwidth allocation information to each ONU 4 through a lower-network-side communication part 24 and an optical fiber section 3.

An uplink bandwidth setting process in the PON section performed by each of the ONUs 4 and an uplink data transmission process performed by each of the lower-network apparatus 5, and each of the ONUs 4, and the OLT 2 are similar to those in the first and second embodiments according to the second disclosure.

The second embodiment according to the second disclosure can be applied to a remote radio head system, for example. For example, in a remote radio head system using LTE™, a processing delay in the second embodiment according to the second disclosure is larger by the processing time of the Report packet generation part 25 than the processing delay in the first embodiment according to the second disclosure. However, the increment of the processing delay is sufficiently smaller than 1 ms, and therefore, in the second embodiment according to the second embodiment, the bandwidth control processing can be performed so as to have a sufficient time allowance as in the first embodiment according to the second disclosure.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable.

Third Embodiment According to Second Disclosure

FIG. 2-9 shows a configuration of an optical communication system of a third embodiment according to the second disclosure. The third embodiment according to the second disclosure is different from the first embodiment according to the second disclosure, and each of the ONUs 4 includes a Report packet generation part 41. For example, an ONU 4-1 includes a Report packet generation part 41-1.

Figures 1, 2:
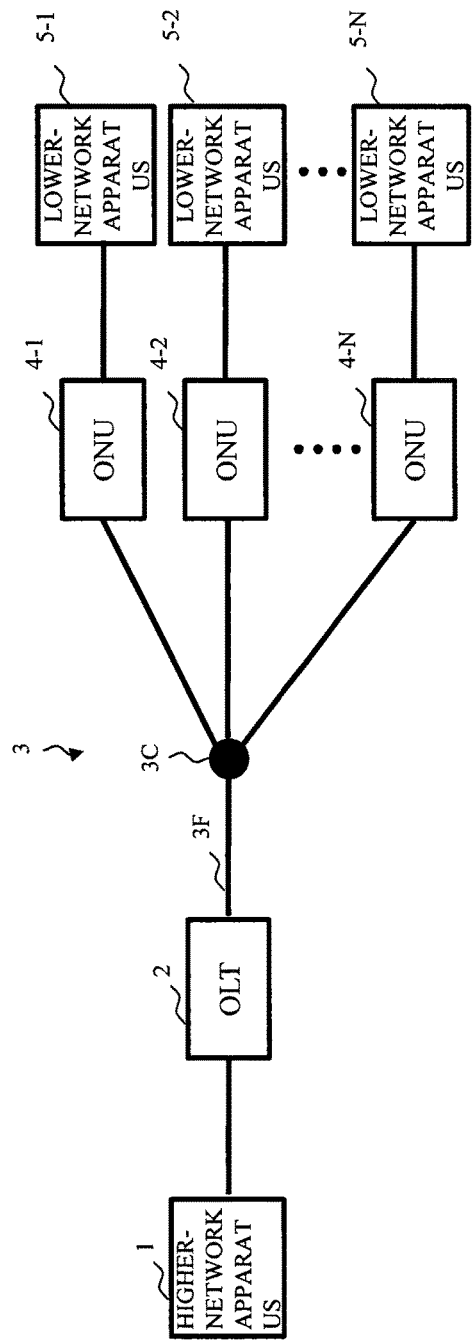
Figure 2:
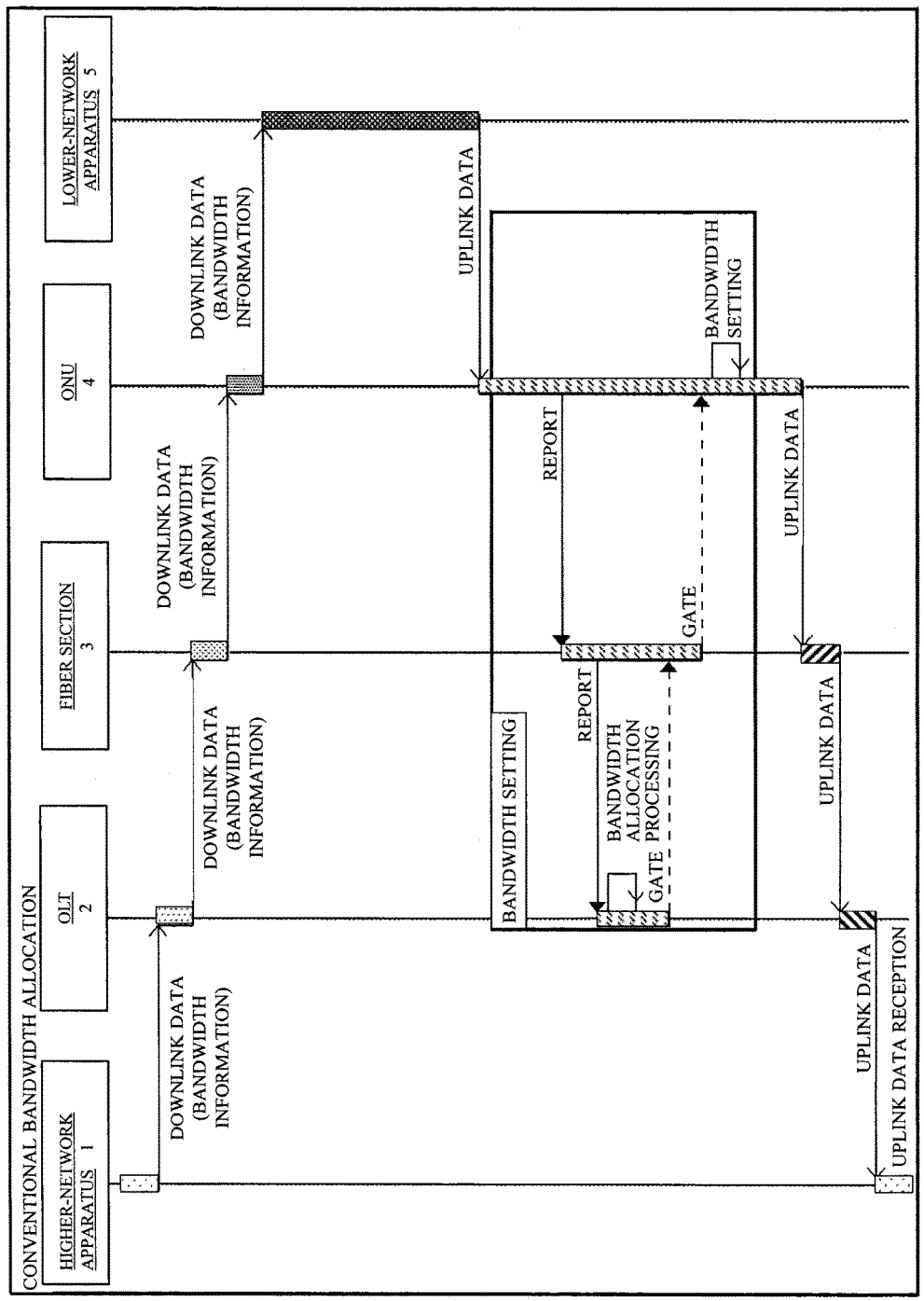
Figures 2, 3:
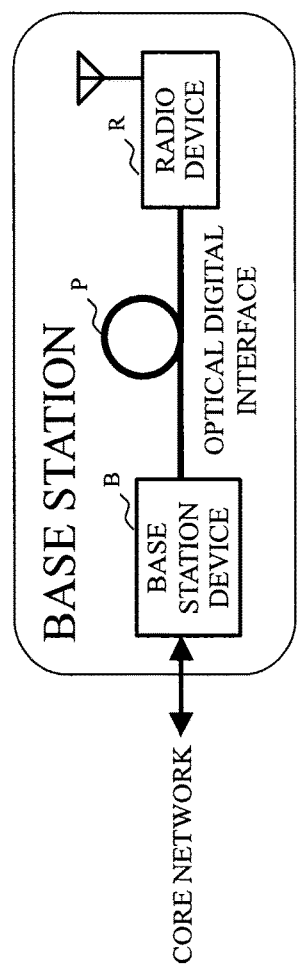
Figures 2, 3, 4:
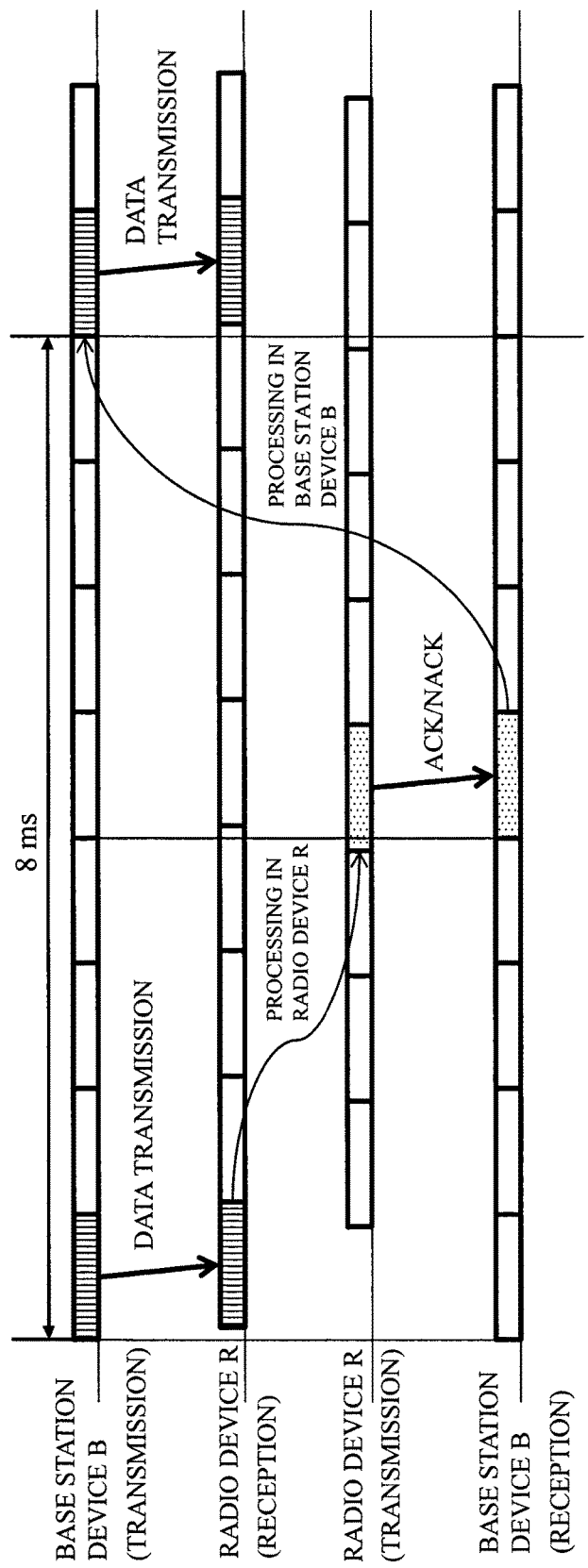
Figures 2, 3, 4, 5:
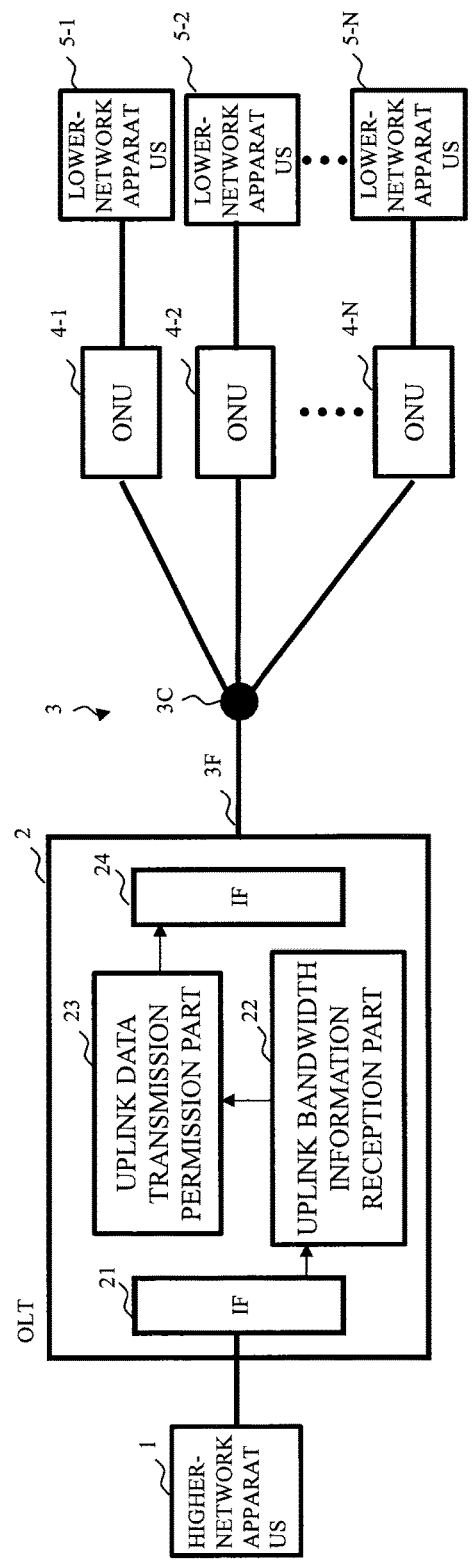
Figures 2, 3, 4, 5, 6:
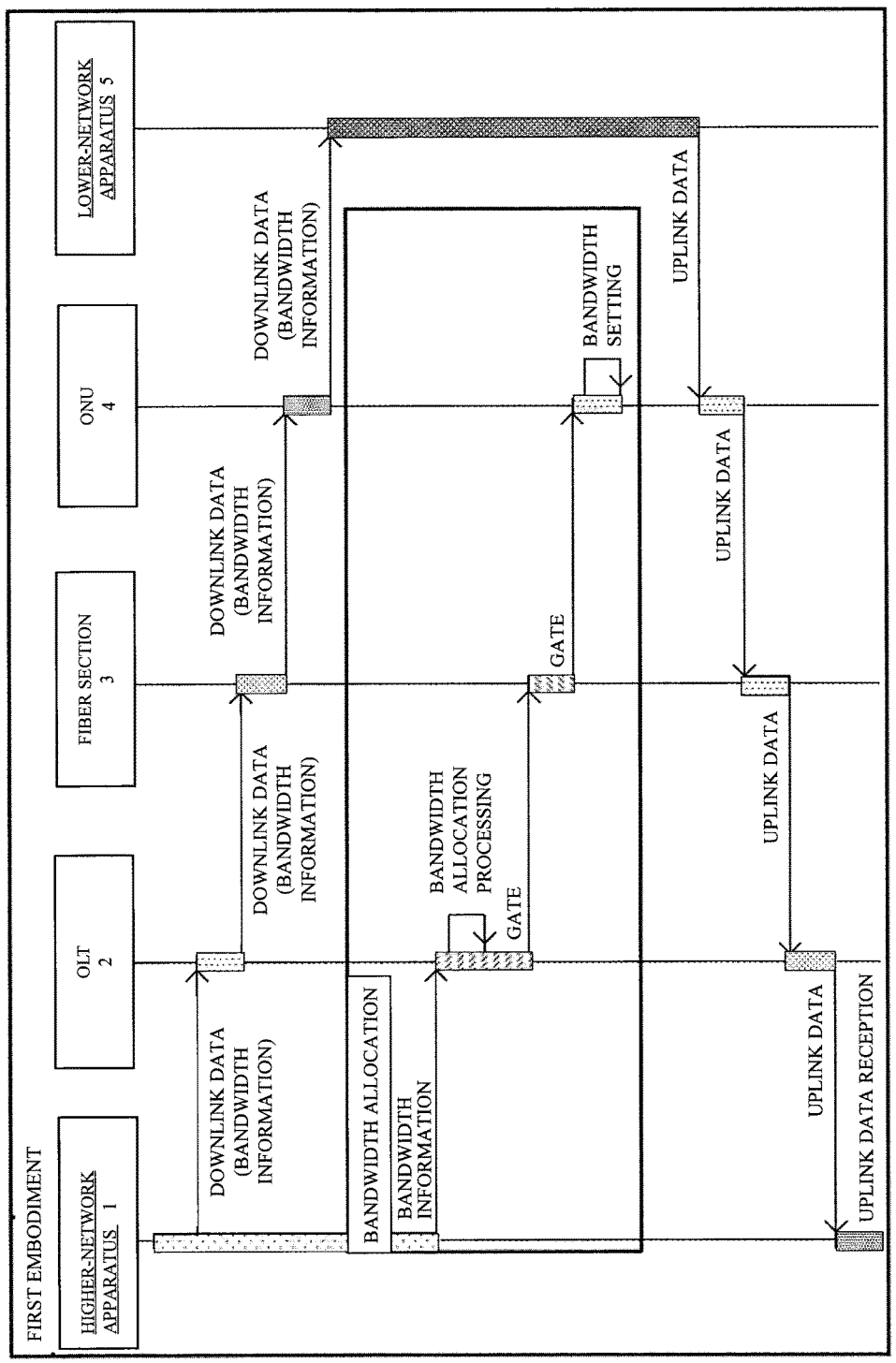
Figures 2, 3, 4, 5, 6, 7:
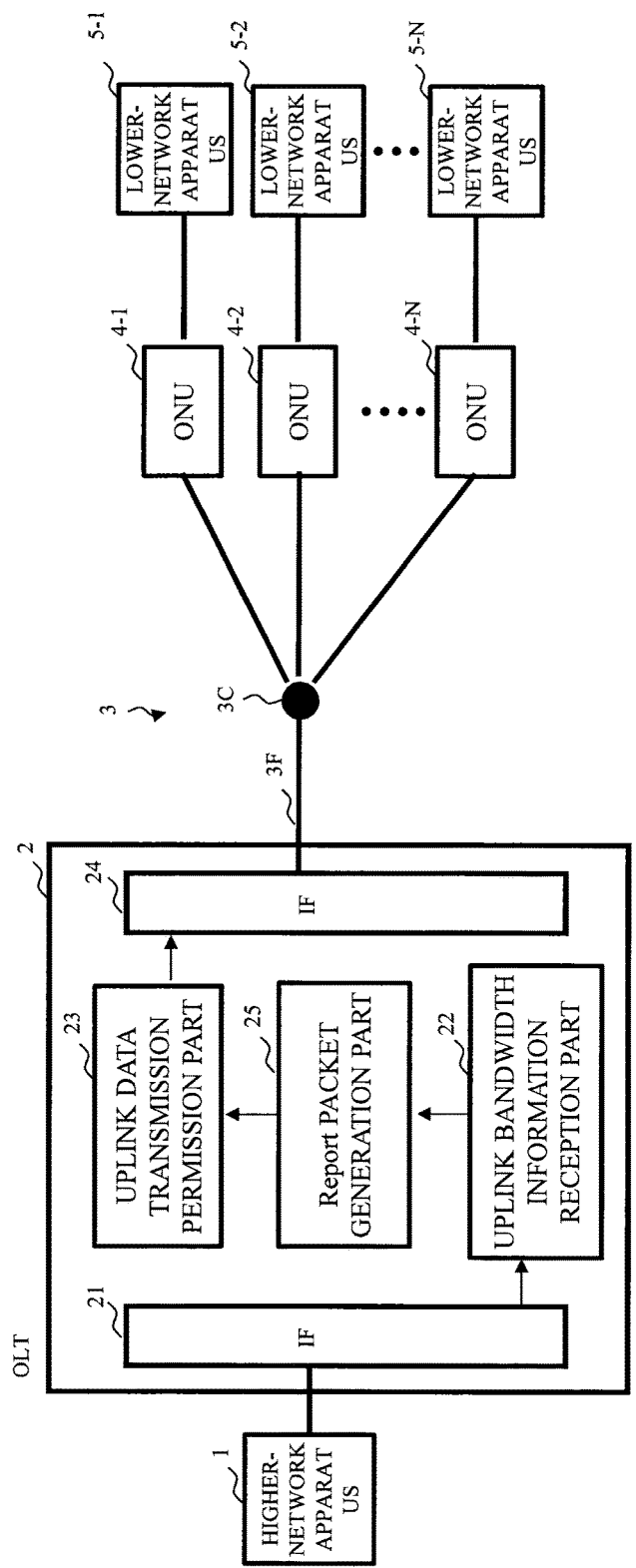
Figures 2, 3, 4, 5, 6, 7, 8:
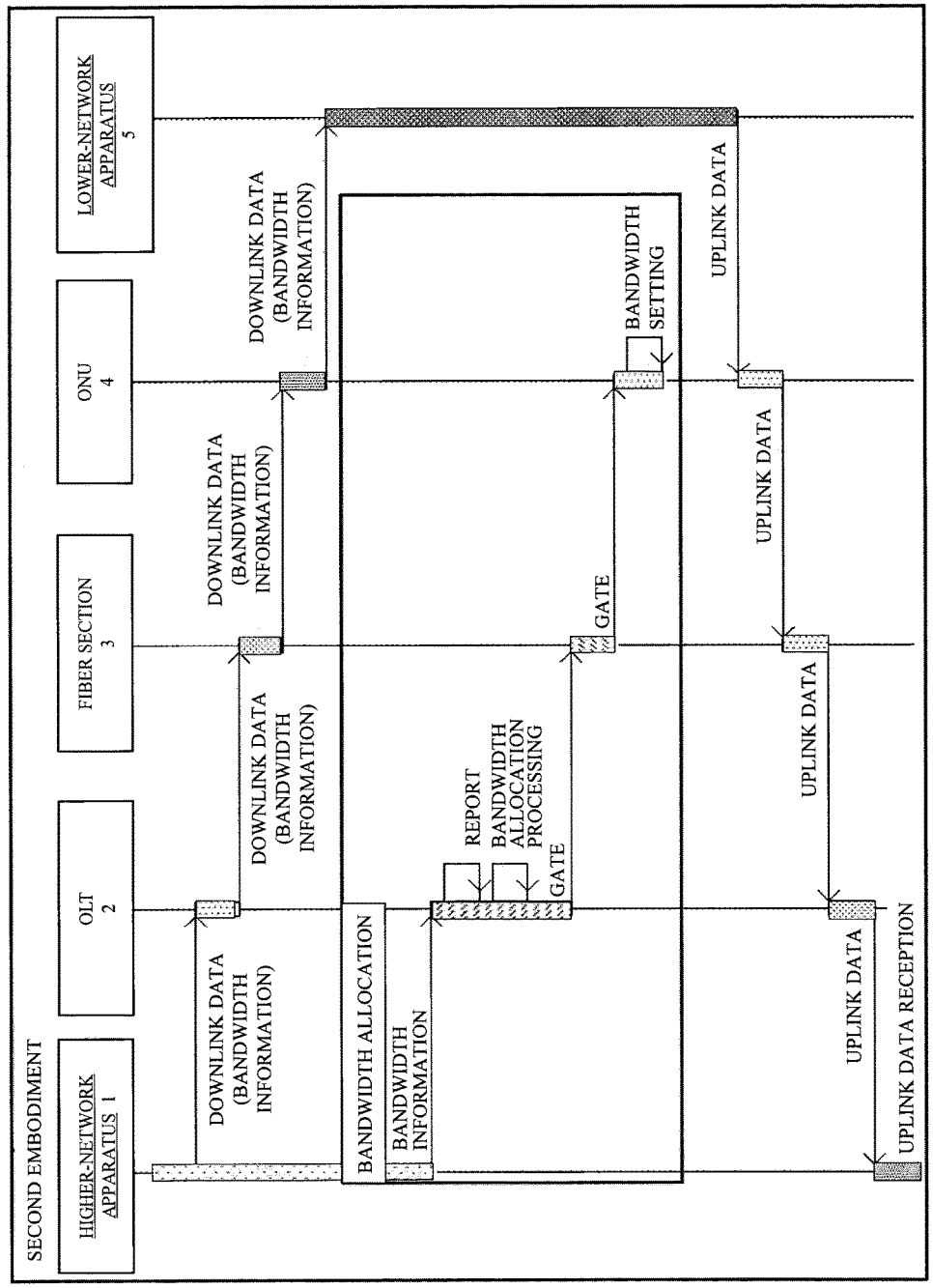
Figures 2, 3, 4, 5, 6, 7, 8, 9:
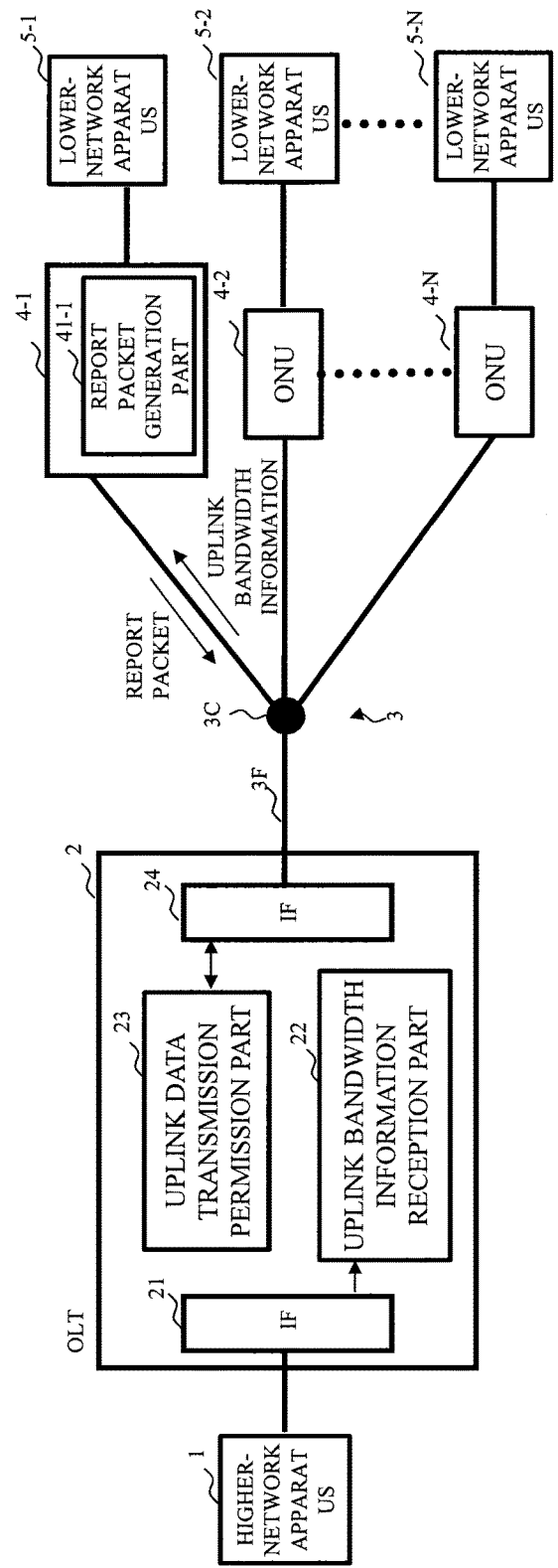
Figures 2, 3, 4, 5, 6, 7, 8, 9, 10:
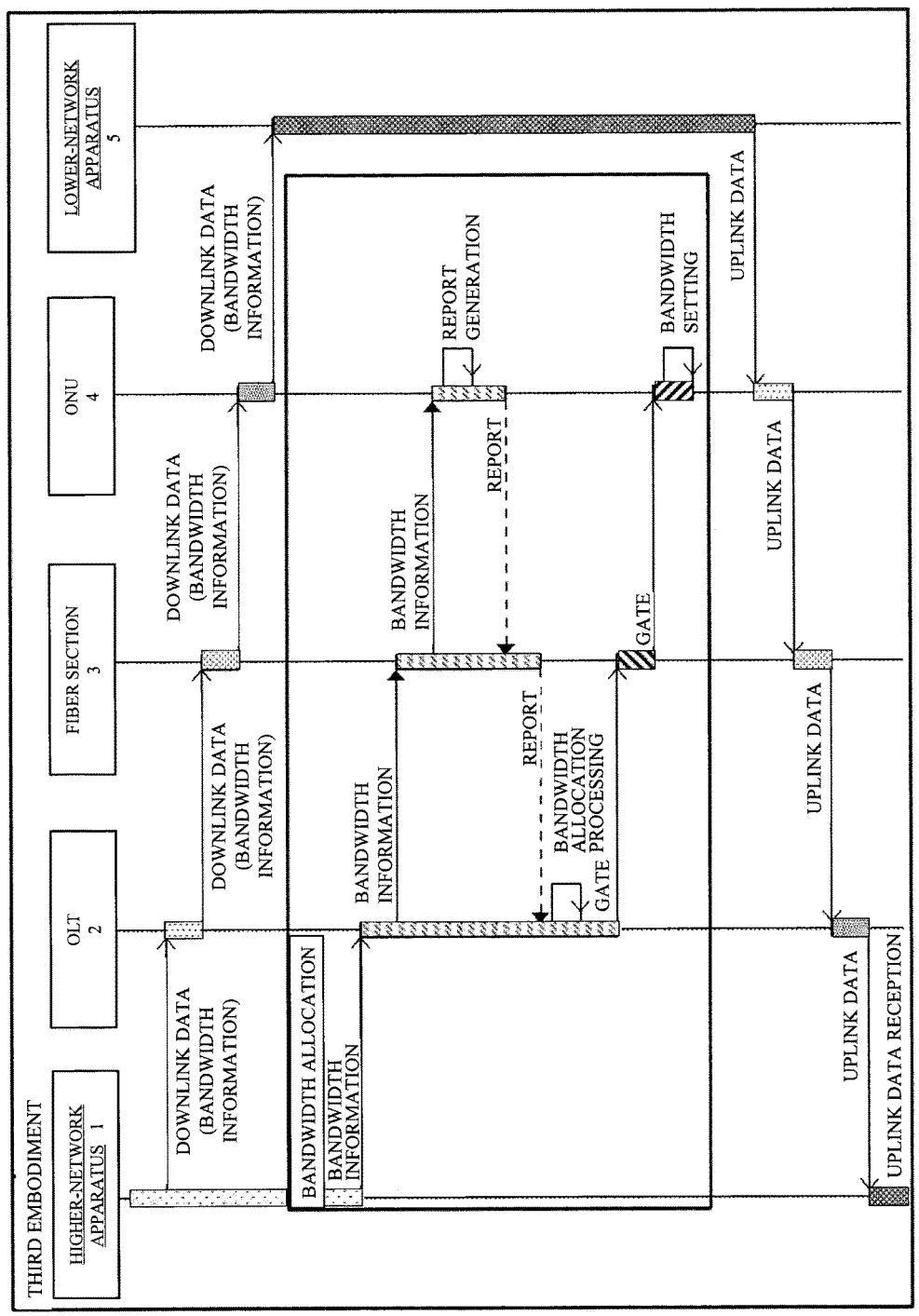

FIG. 2-10 is a time chart showing an uplink data transfer procedure of the third embodiment according to the second disclosure. A transmission process of transmitting bandwidth information of scheduling for uplink communication from each lower-network apparatus 5 to a higher-network apparatus 1 performed by the device 1 itself with respect to each of the lower-network apparatus 5 and an OLT 2 is similar to that in the first and third embodiments according to the second disclosure.

An uplink bandwidth information reception part 22 obtains the bandwidth information of the scheduling for the uplink communication from the higher-network apparatus 1 through a higher-network-side communication part 21, and here the uplink communication is a communication from each of the lower-network apparatus 5 to the higher-network apparatus 1. The uplink bandwidth information reception part 22 transmits the bandwidth information of the scheduling for the uplink communication from each of the lower-network apparatus 5 to the higher-network apparatus 1 to each of the ONUs 4 through a lower-network-side communication part 24 and an optical fiber section 3.

The Report packet generation part 41 of each of the ONUs 4 generates a Report packet based on the bandwidth information of the scheduling for the uplink communication from each of the lower-network apparatus 5 to the higher-network apparatus 1. The Report packet generation part 41 of each of the ONUs 4 then transmits the Report packet to the OLT 2 through the optical fiber section 3.

An uplink data transmission permission part 23 executes bandwidth allocation processing in a PON section based on the Report packet generated by the Report packet generation part 41 of each of the ONUs 4. The uplink data transmission permission part 23 then transmits a Gate packet for transmission of the bandwidth allocation information to each other ONUs 4 through the lower-network-side communication part 24 and the optical fiber section 3.

An uplink bandwidth setting process in the PON section performed by each of the ONUs 4 and an uplink data transmission process performed by each of the lower-network apparatus 5, and each of the ONUs 4, and the OLT 2 are similar to those in the first and third embodiments according to the second disclosure.

The third embodiment according to the second disclosure can be applied to a remote radio head system, for example. For example in a remote radio head system using LTE™, a processing delay in the third embodiment according to the second disclosure is larger by the processing time of the Report packet generation part 41 of each of the ONUs 4 and transmission duration of a bandwidth information packet and the Report packet than the processing delay in the first embodiment according to the second disclosure. However, the increment of the processing delay is at most about 1 ms, and therefore, in the third embodiment according to the second embodiment, the bandwidth control processing can be performed so as to have a sufficient time allowance as in the first embodiment according to the second disclosure.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable.

Fourth Embodiment According to Second Disclosure

Figures 2, 3, 4, 5, 6, 7, 8, 9, 10, 11:
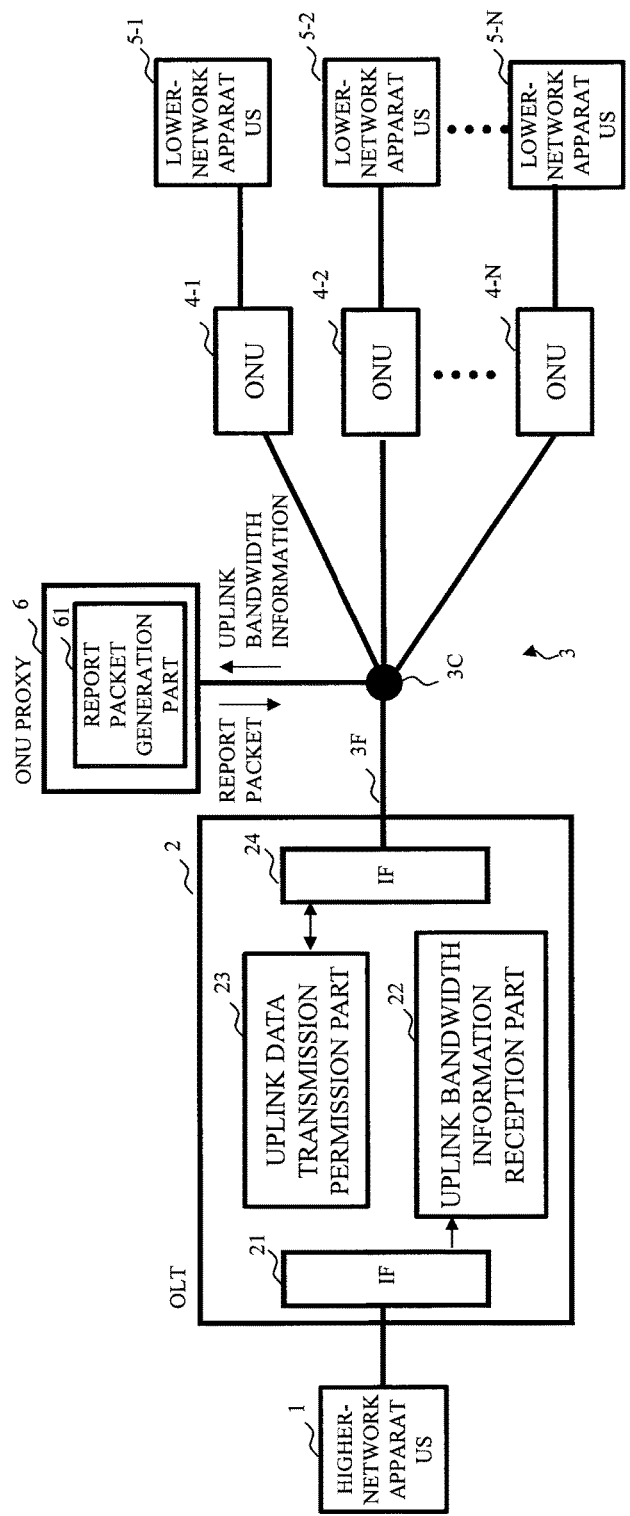

FIG. 2-11 shows a configuration of an optical communication system of a fourth embodiment according to the second disclosure. The fourth embodiment according to the second disclosure is different from the first embodiment according to the second disclosure, and while an optical communication system includes a ONU PROXY 6, the ONU PROXY 6 includes a Report packet generation part 61. The ONU PROXY 6 is installed physically near an OLT 2 and connected to an optical fiber 3F through an optical coupler 3C.

Figures 2, 3, 4, 5, 6, 7, 8, 9, 10, 11, 12:
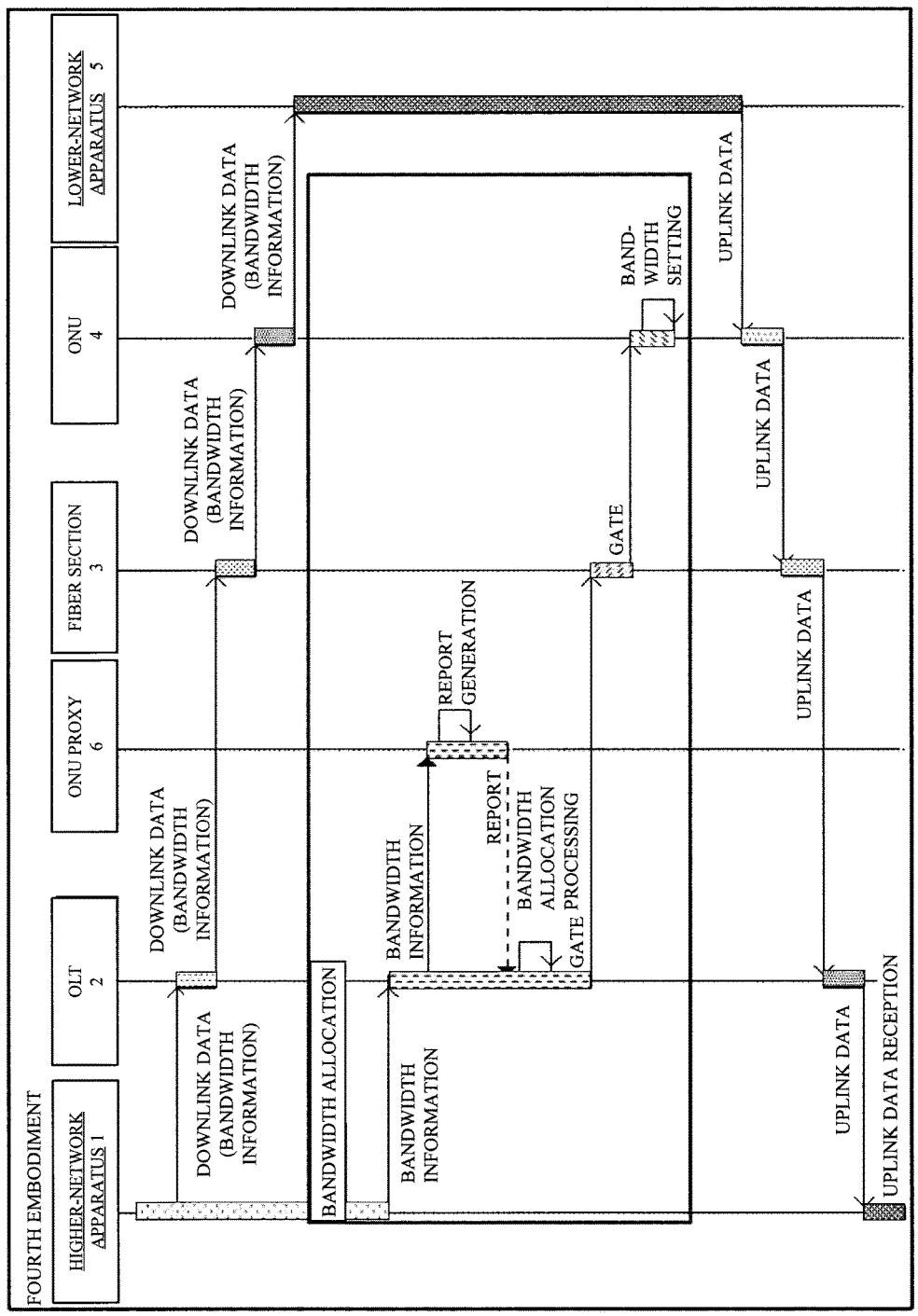

FIG. 2-12 is a time chart showing an uplink data transfer procedure of the fourth embodiment according to the second disclosure. A transmission process of transmitting bandwidth information of scheduling for uplink communication from each lower-network apparatus 5 to a higher-network apparatus 1 performed by the device 1 itself with respect to each of the lower-network apparatus 5 and the OLT 2 is similar to that in the first and fourth embodiments according to the second disclosure.

An uplink bandwidth information reception part 22 obtains the bandwidth information of the scheduling for the uplink communication from the higher-network apparatus 1 through a higher-network-side communication part 21, and here the uplink communication is a communication from each of the lower-network apparatus 5 to the higher-network apparatus 1. The uplink bandwidth information reception part 22 transmits the bandwidth information of the scheduling for the uplink communication from each of the lower-network apparatus 5 to the higher-network apparatus 1 to the ONU PROXY 6 through a lower-network-side communication part 24 and an optical fiber section 3.

The Report packet generation part 61 of the ONU PROXY 6 generates a Report packet based on the bandwidth information of the scheduling for the uplink communication from each of the lower-network apparatus 5 to the higher-network apparatus 1. The Report packet generation part 61 of the ONU PROXY 6 then transmits the Report packet to the OLT 2 through the optical fiber section 3.

An uplink data transmission permission part 23 executes bandwidth allocation processing in a PON section based on the Report packet generated by the Report packet generation part 61 of the ONU PROXY 6. The uplink data transmission permission part 23 then transmits a Gate packet for transmission of the bandwidth allocation information to each ONU 4 through the lower-network-side communication part 24 and the optical fiber section 3.

An uplink bandwidth setting process in the PON section performed by each of the ONUs 4 and an uplink data transmission process performed by each of the lower-network apparatus 5, each of the ONUs 4 and the OLT 2 are similar to those in the first and fourth embodiments according to the second disclosure.

The fourth embodiment according to the second disclosure can be applied to a remote radio head system, for example. For example in a remote radio head system using LTE™, a processing delay in the fourth embodiment according to the second disclosure is larger by the processing time of the Report packet generation part 61 of the ONU PROXY 6 and transmission duration of a bandwidth information packet and the Report packet than the processing delay in the first embodiment of the second disclosure. However, the increment of the processing delay is at most about 1 ms, and therefore, in the fourth embodiment according to the second embodiment, the bandwidth control processing can be performed so as to have a sufficient time allowance as in the first embodiment according to the second disclosure.

Since the ONU PROXY 6 is installed physically near the OLT 2 as compared with each of the ONUs 4, in the fourth embodiment according to the second disclosure, the transmission duration of the bandwidth information packet and the Report packet can be reduced as compared with the third embodiment according to the second disclosure.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable. In addition, it is not necessary to modify the configuration of each of the ONUs 4 from a conventional configuration.

Fifth Embodiment According to Second Disclosure

Figures 2, 3, 4, 5, 6, 7, 8, 9, 10, 11, 12, 13:
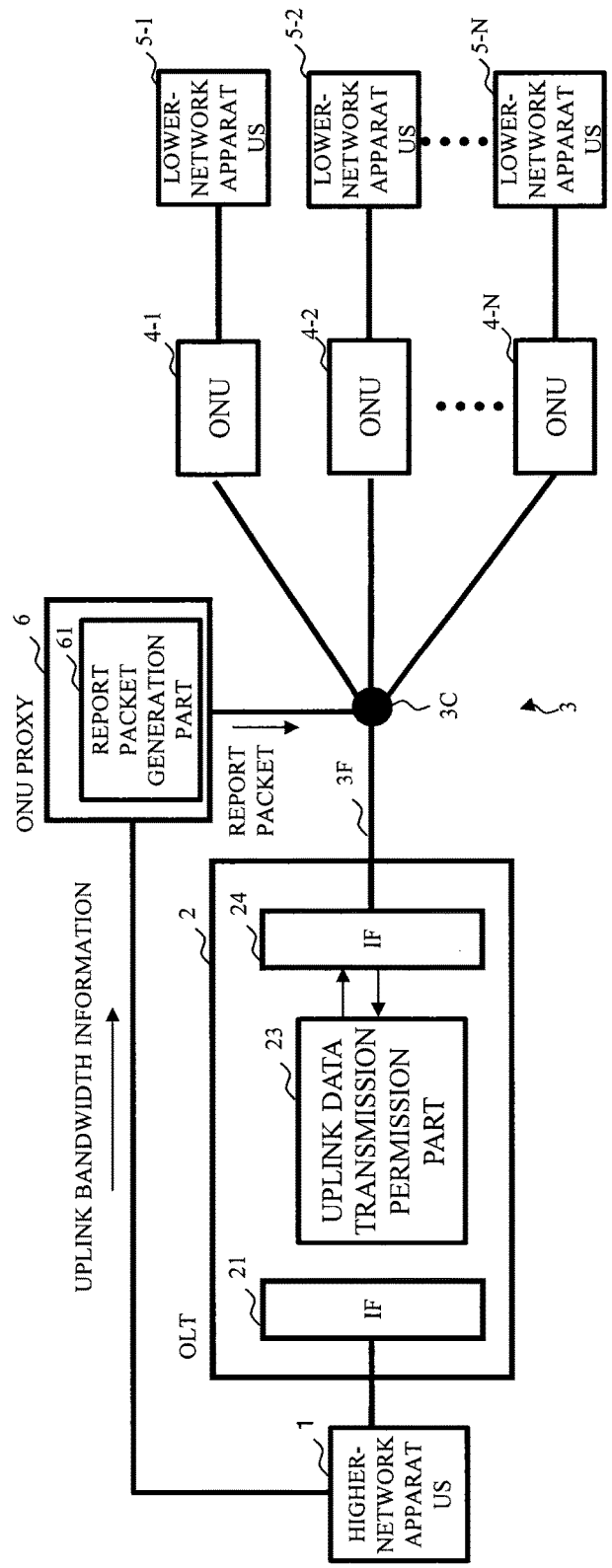

FIG. 2-13 shows a configuration of an optical communication system of a fifth embodiment according to the second disclosure. The fifth embodiment according to the second disclosure is different from the first embodiment according to the second disclosure, and an optical communication system includes a ONU PROXY 6, and the ONU PROXY 6 includes a Report packet generation part 61. The ONU PROXY 6 is installed physically near an OLT 2, connected to an optical fiber 3F through an optical coupler 3C, and connected directly to a higher-network apparatus 1 not through the OLT 2 and an optical fiber section 3.

Figures 2, 3, 4, 5, 6, 7, 8, 9, 10, 11, 12, 13, 14:
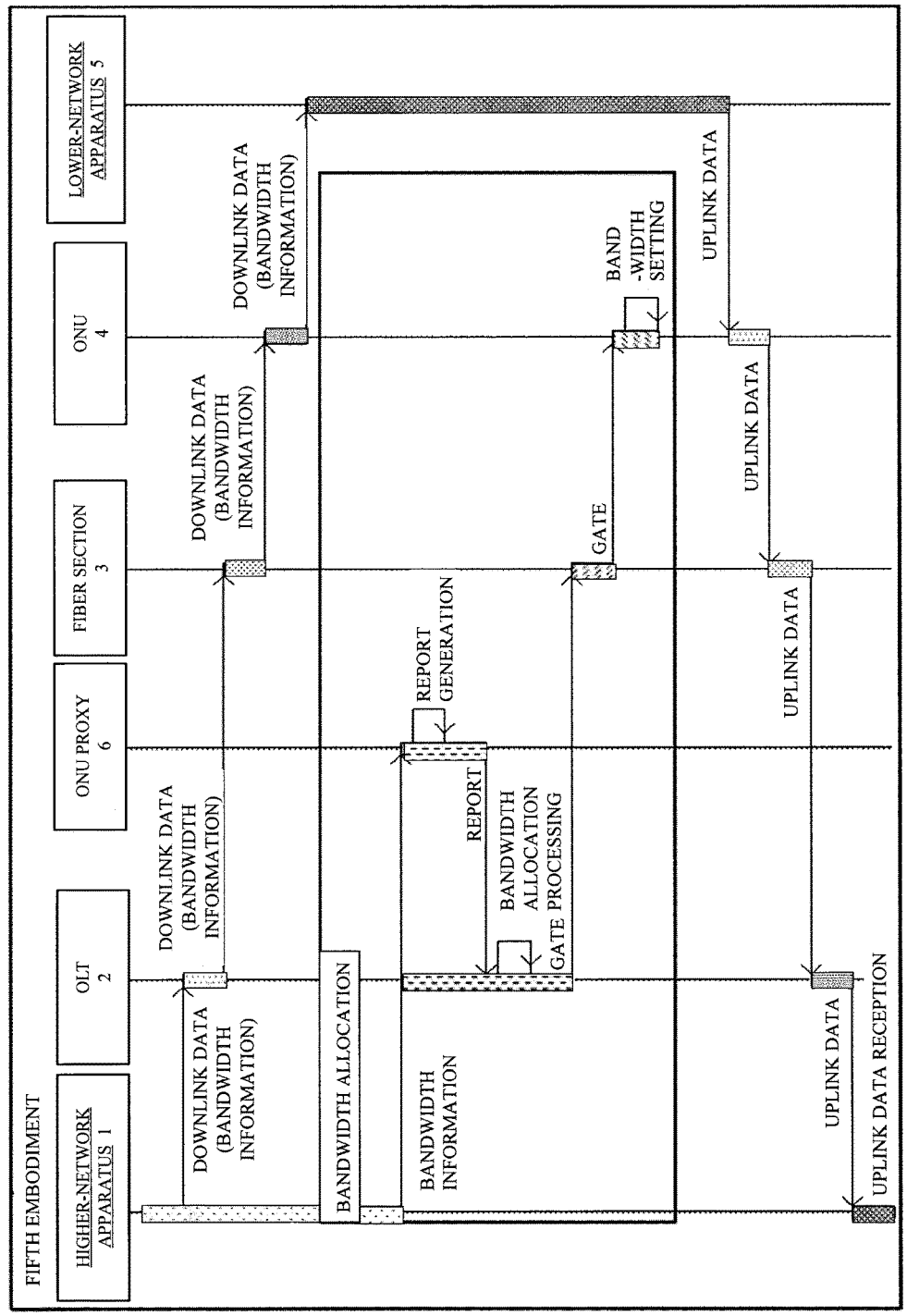

FIG. 2-14 is a time chart showing an uplink data transfer procedure of the fifth embodiment according to the second disclosure. A transmission process of transmitting bandwidth information of scheduling for uplink communication from each lower-network apparatus 5 to the higher-network apparatus 1 performed by the device 1 itself with respect to each of the lower-network apparatus 5 is similar to that in the first and fifth embodiments according to the second disclosure.

In parallel with the transmission process of transmitting the bandwidth information of scheduling for uplink communication, the higher-network apparatus 1 notifies, directly, the ONU PROXY 6 of the bandwidth information of the scheduling for the uplink communication from each of the lower-network apparatus 5 to the device 1 itself not through the OLT 2 and the optical fiber section 3.

The Report packet generation part 61 of the ONU PROXY 6 generates a Report packet based on the bandwidth information of the scheduling for the uplink communication from each of the lower-network apparatus 5 to the higher-network apparatus 1. The Report packet generation part 61 of the ONU PROXY 6 then transmits the Report packet to the OLT 2 through the optical fiber section 3.

An uplink data transmission permission part 23 executes bandwidth allocation processing in a PON section based on the Report packet generated by the Report packet generation part 61 of the ONU PROXY 6. The uplink data transmission permission part 23 then transmits a Gate packet for transmission of the bandwidth allocation information to each of the ONUs 4 through a lower-network-side communication part 24 and the optical fiber section 3.

An uplink bandwidth setting process in the PON section performed by each of the ONUs 4 and an uplink data transmission process performed by each of the lower-network apparatus 5, and each of the ONUs 4, and the OLT 2 are similar to those in the first and fifth embodiments according to the second disclosure.

The fifth embodiment according to the second disclosure can be applied to a remote radio head system, for example. For example in a remote radio head system using LTE™, a processing delay in the fifth embodiment according to the second disclosure is larger by the processing time of the Report packet generation part 61 of the ONU PROXY 6 and transmission duration of a bandwidth information packet and the Report packet than the processing delay in the first embodiment according to the second disclosure. However, the increment of the processing delay is at most about 1 ms, and therefore, in the fifth embodiment according to the second embodiment, the bandwidth control processing can be performed so as to have a sufficient time allowance as in the first embodiment according to the second disclosure.

Since the ONU PROXY 6 is connected directly to the higher-network apparatus 1 not through the OLT 2 and the optical fiber section 3, in the fifth embodiment according to the second disclosure, the transmission duration of the bandwidth information packet can be reduced as compared with the fourth embodiment according to the second disclosure.

Thus, in a communication system constituted of the higher-network apparatus 1 and the lower-network apparatus 5 connected through a PON system, the uplink data can be transferred at high speed from the lower-network apparatus 5 to the higher-network apparatus 1 so as to meet severe conditions required for a delay time between the higher-network apparatus 1 and the lower-network apparatus 5. Naturally, in the bandwidth allocation processing in the OLT 2, a conventional DBA technology is usable. In addition, it is not necessary to modify the configuration of each of the ONUs 4 from a conventional configuration.
(Remote Radio Head System)

The first to fifth embodiments according to the second disclosure can be applied to the remote radio head system, as described above. For example, in the remote radio head system using LTE™, after the base station device B transmits downlink data including a downlink control channel, the ONU 4 is required to receive transmission of bandwidth information and execute bandwidth setting within four sub frames (4 ms) (see Non Patent Literature 3). However, in the first to fifth embodiments according to the second disclosure, since the processing delay can be suppressed to about 1 ms as described above, the bandwidth control processing can be performed so as to have a sufficient time allowance.

When the higher-network apparatus 1 and the lower-network apparatus 5 are respectively a base station device B (BBU) and a radio device R (RRH), an interface demarcation point between the base station device B and the radio device R is usually standardized at an IQ data point in a base band in a radio physical layer as described in CPRI (Common Public Radio Interface) (see Patent Literature 4) which is an industry standard; however, the interface demarcation point may be each point of physical layer configuration of LTE™ shown in FIG. 2-15.

Although means for transmitting the uplink bandwidth information from the higher-network apparatus 1 to the uplink bandwidth information reception part 22 of the OLT 2 includes a method of transmitting the uplink bandwidth information directly to the uplink bandwidth information reception part 22 with the use of a dedicated control line and a method of performing packet multiplying with the use of an interface for data to transmit the packet to the OLT 2, filtering the packet in the OLT 2 to extract the uplink bandwidth information, and transmitting the uplink bandwidth information to the uplink bandwidth information reception part 22. The information can be transmitted in about 1 ms even by employing any of the methods, and when LTE™ is targeted, a time allowance in the bandwidth allocation processing is sufficient.

Regarding the uplink bandwidth information transmitted from the higher-network apparatus 1 to each of the lower-network apparatus 5, identification information for each of the lower-network apparatus 5 is essential, and an arrival time of data transmitted from each of the lower-network apparatus 5 to each of the ONUs 4 and data length are essential, and other management information is added.

The first and second disclosures are not limited to those according to the above embodiments. For example, the configurations of the embodiments according to the first disclosure may be combined with the configurations of the embodiments according to the second disclosure. When the embodiments according to the first disclosure is combined with the embodiments according to the second disclosure, in an optical communication system, the higher-network apparatus 1 according to the first disclosure performs scheduling with respect to each of the lower-network apparatus 5, calculates the transmission time and the transmission permission amount of the uplink data from each of the ONUs 4 to the OLT 2 based on the scheduling, and notifies the OLT 2 of the transmission time and the transmission permission amount of the uplink data. The OLT 2 according to the second disclosure is connected to the higher-network apparatus 1 and each of the ONUs 4 according to the first disclosure, receives notification of the scheduling for uplink communication from the higher-network apparatus according to the first disclosure, calculates the transmission time and the transmission permission amount of the uplink data from each of the ONUs 4 to the device itself based on the scheduling for uplink communication, and notifies each of the ONUs 4 of the transmission time and the transmission permission amount of the uplink data. Therefore, the combination of the embodiments according to the first disclosure with the embodiments according to the second disclosure can reduce the delay time generated until the processing of bandwidth control starts.

INDUSTRIAL APPLICABILITY

The optical communication system, the optical communication method, the optical line terminal, and the higher-level device according to the present disclosure can be applied to a communication system where conditions required for a delay time between the higher-network apparatus and a lower-network apparatus are severe, and for example, a remote radio head system where conditions required for the delay time between a base station device and a radio device are severe.

REFERENCE SIGNS LIST (Reference Signs List in First to Third Embodiments According to First Disclosure)
1: higher-network apparatus
2: OLT
3: optical fiber section
3F: optical fiber
3C: optical coupler
4, 4-1, 4-2, 4-N: ONU
5, 5-1, 5-2, 5-N: lower-network apparatus
B: base station device
R: radio device
P: optical digital interface
11: scheduling execution part
12: uplink data transmission permission part
21: filter part
22: bandwidth control processing part
(Reference Signs List in First to Fifth Embodiments According to Second Disclosure)
1: higher-network apparatus
2: OLT
3: optical fiber section
3F: optical fiber
3C: optical coupler
4, 4-1, 4-2, 4-N: ONU
5, 5-1, 5-2, 5-N: lower-network apparatus
6: ONU PROXY
B: base station device
R: radio device
P: optical digital interface
21: higher-network-side communication part
22: uplink bandwidth information reception part
23: uplink data transmission permission part
24: lower-network-side communication part
25: Report packet generation part
41, 41-1: Report packet generation part
61: Report packet generation part

The invention claimed is:

1. An optical communication system comprising:
one or a plurality of optical network units;
an optical line terminal connected to the one or a plurality of optical network units through an optical fiber and an optical coupler;
one or a plurality of lower-network apparatus connected to the lower level of each of the optical network units; and
a higher-network apparatus which is connected to the higher network of the optical line terminal, performs scheduling for uplink communication from each of the lower-network apparatus to the device itself with respect to each of the lower-network apparatus, calculates a transmission time and a transmission permission amount of uplink data transmitted from each of the optical network units to the optical line terminal based on the scheduling, and notifies the optical line terminal of the transmission time and the transmission permission amount of the uplink data.

2. The optical communication system according to claim 1, wherein the higher-network apparatus calculates the transmission time and the transmission permission amount of the uplink data transmitted from each of the optical network units to the optical line terminal based on information on a delay time between each of the optical network units and the optical line terminal obtained from the optical line terminal and notifies the optical line terminal of the transmission time and the transmission permission amount of the uplink data.

3. The optical communication system according to claim 1 or 2, wherein the one or a plurality of the lower-network apparatus are one or a plurality of radio devices in a remote radio head system, and the higher-network apparatus is a base station device in the remote radio head system.

4. An optical communication method comprising in order:
a scheduling execution step in which a higher-network apparatus performs, with respect to one or a plurality of lower-network apparatus communicating with the device itself, scheduling for uplink communication from each of the lower-network apparatus to the device itself; and
an uplink data transmission permission step in which the higher-network apparatus calculates a transmission time and a transmission permission amount of uplink data transmitted from an optical network unit to the optical line terminal based on the scheduling and notifies the optical line terminal, which is an optical line terminal connected to the lower network of the apparatus itself and is connected to one or a plurality of the optical network units, connected to the higher network of each of the lower-network apparatus, through an optical fiber and an optical coupler, of the transmission time and the transmission permission amount of the uplink data.

5. The optical communication method according to claim 4, wherein, in the uplink data transmission permission step, the transmission time and the transmission permission amount of the uplink data transmitted from each of the optical network units to the optical line terminal are calculated based on information on a delay time between each of the optical network units and the optical line terminal obtained from the optical line terminal, and the transmission time and the transmission permission amount of the uplink data are notified to the optical line terminal.

6. The optical communication method according to claim 4 or 5, wherein the one or a plurality of lower-network apparatus are one or a plurality of radio devices in a remote radio head system, and the higher-network apparatus is a base station device in the remote radio head system.

7. A higher-network apparatus comprising:
a scheduling execution part which performs, with respect to one or a plurality of the lower-network apparatus communicating with the device itself, scheduling for uplink communication from each of the lower-network apparatus to the device itself; and
an uplink data transmission permission part which calculates a transmission time and a transmission permission amount of uplink data transmitted from an optical network unit to the optical line terminal based on the scheduling and notifies the optical line terminal, which is an optical line terminal connected to the lower network of the apparatus itself and is connected to one or a plurality of the optical network units, connected to the higher network of each of the lower-network apparatus, through an optical fiber and an optical coupler, of the transmission time and the transmission permission amount of the uplink data.

8. The higher-network apparatus according to claim 7, wherein the uplink data transmission permission part calculates the transmission time and the transmission permission amount of the uplink data transmitted from each of the optical network units to the optical line terminal based on information on a delay time between each of the optical network units and the optical line terminal obtained from the optical line terminal and notifies the optical line terminal of the transmission time and the transmission permission amount of the uplink data.

9. An optical communication system comprising:
one or a plurality of lower-network apparatus;
a higher-network apparatus which communicates with the one or a plurality of lower-network apparatus and performs scheduling for uplink communication from each of the lower-network apparatus to the device itself with respect to each of the lower-network apparatus;
one or a plurality of optical network units which are connected to the higher network of each of the lower-network apparatus;
an optical line terminal which is connected to the lower level of the higher-network apparatus and, at the same time, connected to the one or a plurality of optical network units through an optical fiber and an optical coupler, receives notification of the scheduling for uplink communication from the higher-network apparatus, calculates a transmission time and a transmission permission amount of uplink data transmitted from each of the optical network units to the device itself based on the scheduling for uplink communication, and notifies each of the optical network units of the transmission time and the transmission permission amount of the uplink data.

10. The optical communication system according to claim 9, wherein the optical line terminal does not wait for notification of a transmission request amount of the uplink data from each of the optical network units and instead notifies each of the optical network units of the transmission time and the transmission permission amount of the uplink data.

11. The optical communication system according to claim 10, wherein the optical line terminal calculates the transmission request amount of the uplink data, considered to have been notified from each of the optical network units, based on the scheduling for uplink communication and calculates the transmission time and the transmission permission amount of the uplink data based on the transmission request amount of the uplink data.

12. The optical communication system according to any one of claims 9 to 11, wherein the one or a plurality of lower-network apparatus are one or a plurality of radio devices in a remote radio head system, and the higher-network apparatus is a base station device in the remote radio head system.

13. An optical communication method comprising in order:
a scheduling execution step in which a higher-network apparatus performs, with respect to one or a plurality of lower-network apparatus communicating with the device itself, scheduling for uplink communication from each of the lower-network apparatus to the device itself;
a scheduling notification step in which the higher-network apparatus notifies an optical line terminal, connected to the lower network of the apparatus itself, of the scheduling for uplink communication; and
a transmission permission step in which the optical line terminal calculates a transmission time and a transmission permission amount of uplink data transmitted from an optical network unit to the device itself based on the scheduling for uplink communication and notifies one or a plurality of the optical network units, connected to the higher network of each of the lower-network apparatus and, at the same time, connected to the device itself through an optical fiber and an optical coupler, of the transmission time and the transmission permission amount of the uplink data.

14. The optical communication method according to claim 13, wherein in the transmission permission step, the optical line terminal does not wait for notification of a transmission request amount of the uplink data from each of the optical network units and instead notifies each of the optical network units of the transmission time and the transmission permission amount of the uplink data.

15. The optical communication method according to claim 14, wherein in the transmission permission step, the optical line terminal calculates the transmission request amount of the uplink data, considered to have been notified from each of the optical network units, based on the scheduling for uplink communication and calculates the transmission time and the transmission permission amount of the uplink data based on the transmission request amount of the uplink data.

16. The optical communication method according to any one of claims 13 to 15, wherein the one or a plurality of lower-network apparatus are one or a plurality of radio devices in a remote radio head system, and the higher-network apparatus is a base station device in the remote radio head system.

17. An optical line terminal comprising:
a higher-network-side communication part which is an interface for a higher-network apparatus connected to the higher network of the apparatus itself;
a lower-network-side communication part which is connected to the higher network of one or a plurality of lower-network apparatus communicating with the higher-network apparatus and is an interface for one or a plurality of optical network units connected to the device itself through an optical fiber and an optical coupler;
an uplink bandwidth information reception part which obtains, from the higher-network apparatus, scheduling for uplink communication from each of the lower-network apparatus to the higher-network apparatus performed by the higher-network apparatus with respect to each of the lower-network apparatus; and
an uplink data transmission permission part which calculates a transmission time and a transmission permission amount of uplink data transmitted from each of the optical network units to the device itself based on the scheduling for uplink communication, and notifies each of the optical network units of the transmission time and the transmission permission amount of the uplink data.

18. The optical line terminal according to claim 17, wherein the uplink data transmission permission part does not wait for notification of a transmission request amount of the uplink data from each of the optical network units and instead notifies each of the optical network units of the transmission time and the transmission permission amount of the uplink data.

19. The optical line terminal according to claim 18, wherein the uplink data transmission permission part calculates the transmission request amount of the uplink data, considered to have been notified from each of the optical network units, based on the scheduling for uplink communication and calculates the transmission time and the transmission permission amount of the uplink data based on the transmission request amount of the uplink data.

20. The optical line terminal according to any one of claims 17 to 19, wherein the one or a plurality of lower-network apparatus are one or a plurality of radio devices in a remote radio head system, and the higher-network apparatus is a base station device in the remote radio head system.

* * * * *